United States Patent
Lee et al.

(10) Patent No.: US 12,164,052 B1
(45) Date of Patent: Dec. 10, 2024

(54) SOUND SOURCE LOCALIZATION AUDIO TYPE DETECTION

(71) Applicant: Amazon Technologies, Inc., Seattle, WA (US)

(72) Inventors: Borham Lee, Sunnyvale, CA (US); Carlo Murgia, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 452 days.

(21) Appl. No.: 17/025,441

(22) Filed: Sep. 18, 2020

(51) Int. Cl.
*G01S 5/22* (2006.01)
*G10L 15/08* (2006.01)
*G10L 25/06* (2013.01)

(52) U.S. Cl.
CPC .............. *G01S 5/22* (2013.01); *G10L 15/08* (2013.01); *G10L 25/06* (2013.01); *G10L 2015/088* (2013.01)

(58) Field of Classification Search
CPC . G01S 5/22; G10L 15/08; G10L 25/06; G10L 2015/088
See application file for complete search history.

(56) References Cited

U.S. PATENT DOCUMENTS

| | | | |
|---|---|---|---|
| 9,319,787 B1 * | 4/2016 | Chu | H04R 3/005 |
| 9,560,446 B1 * | 1/2017 | Chang | H04R 1/406 |
| 9,965,685 B2 * | 5/2018 | Matsuoka | G06V 10/40 |
| 10,732,258 B1 * | 8/2020 | Sundaram | G10L 25/30 |
| 11,043,218 B1 * | 6/2021 | Sun | G10L 15/22 |
| 11,290,802 B1 * | 3/2022 | Nandy | G10L 15/08 |
| 2010/0329479 A1 * | 12/2010 | Nakadai | B25J 9/00 381/92 |
| 2018/0350379 A1 * | 12/2018 | Wung | G10L 21/038 |
| 2020/0202883 A1 * | 6/2020 | Maalouli | G10L 15/08 |

FOREIGN PATENT DOCUMENTS

GB 2517690 A * 3/2015 ............. G01S 3/801

* cited by examiner

*Primary Examiner* — Yuqing Xiao
*Assistant Examiner* — Christopher Richard Walker
(74) *Attorney, Agent, or Firm* — Pierce Atwood LLP

(57) ABSTRACT

A system configured to perform audio type detection for sound source localization (SSL) data is provided. A device processes audio data representing sounds from multiple sound sources to determine SSL data that distinguishes between each of the sound sources. To identify an audio type associated with a sound source and/or track individual sound sources over time, the device can determine a correlation between the SSL data and an audio event. Examples of audio events include a wakeword component detecting a wakeword or an acoustic event detector detecting a particular acoustic event. The device may determine a correlation between wakeword data indicating that a wakeword is represented in the audio data and SSL data for each individual sound source. The device may then identify a sound source that is most strongly correlated to the wakeword data and associate the wakeword and a corresponding voice command with the sound source.

22 Claims, 16 Drawing Sheets

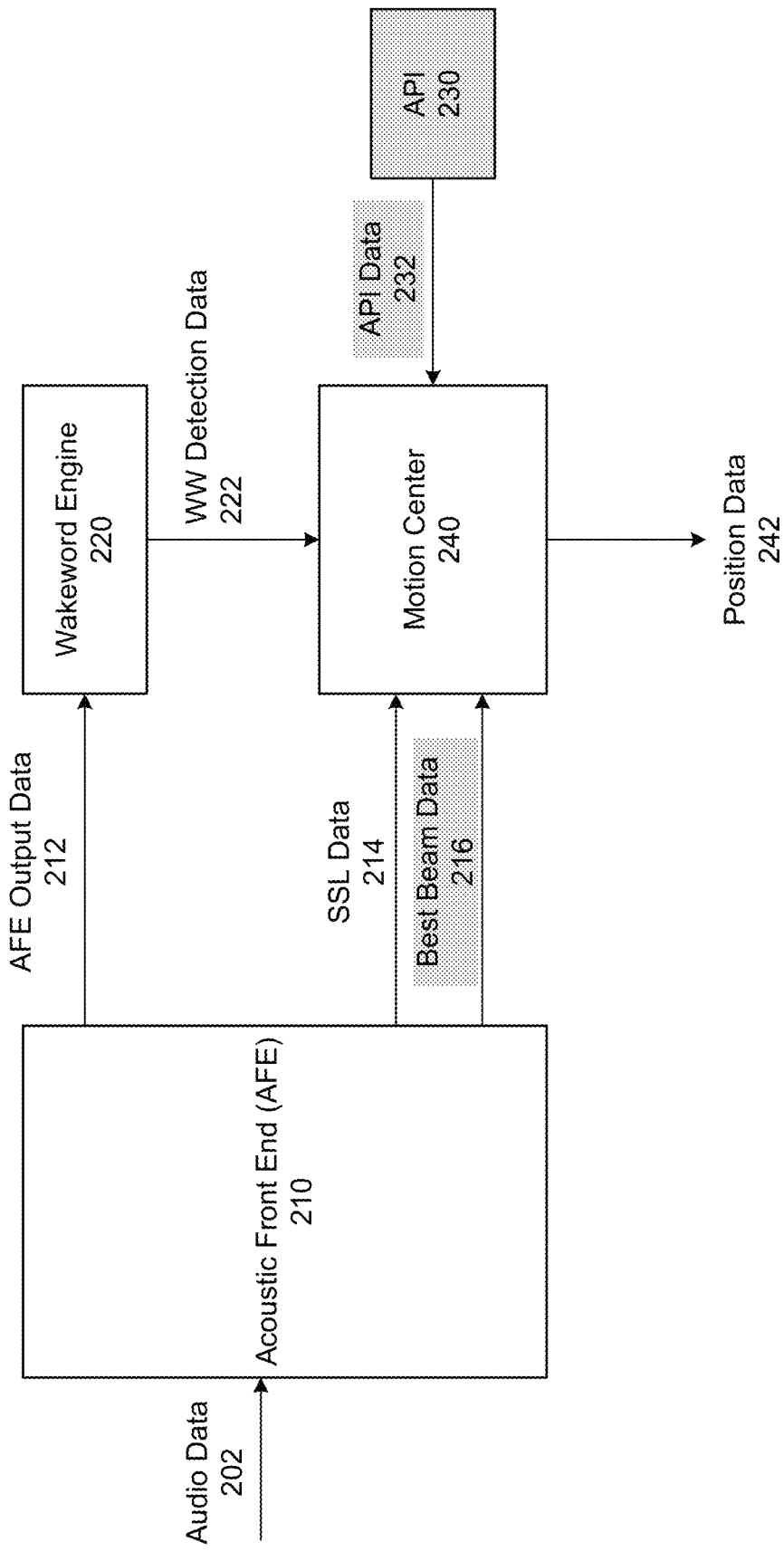

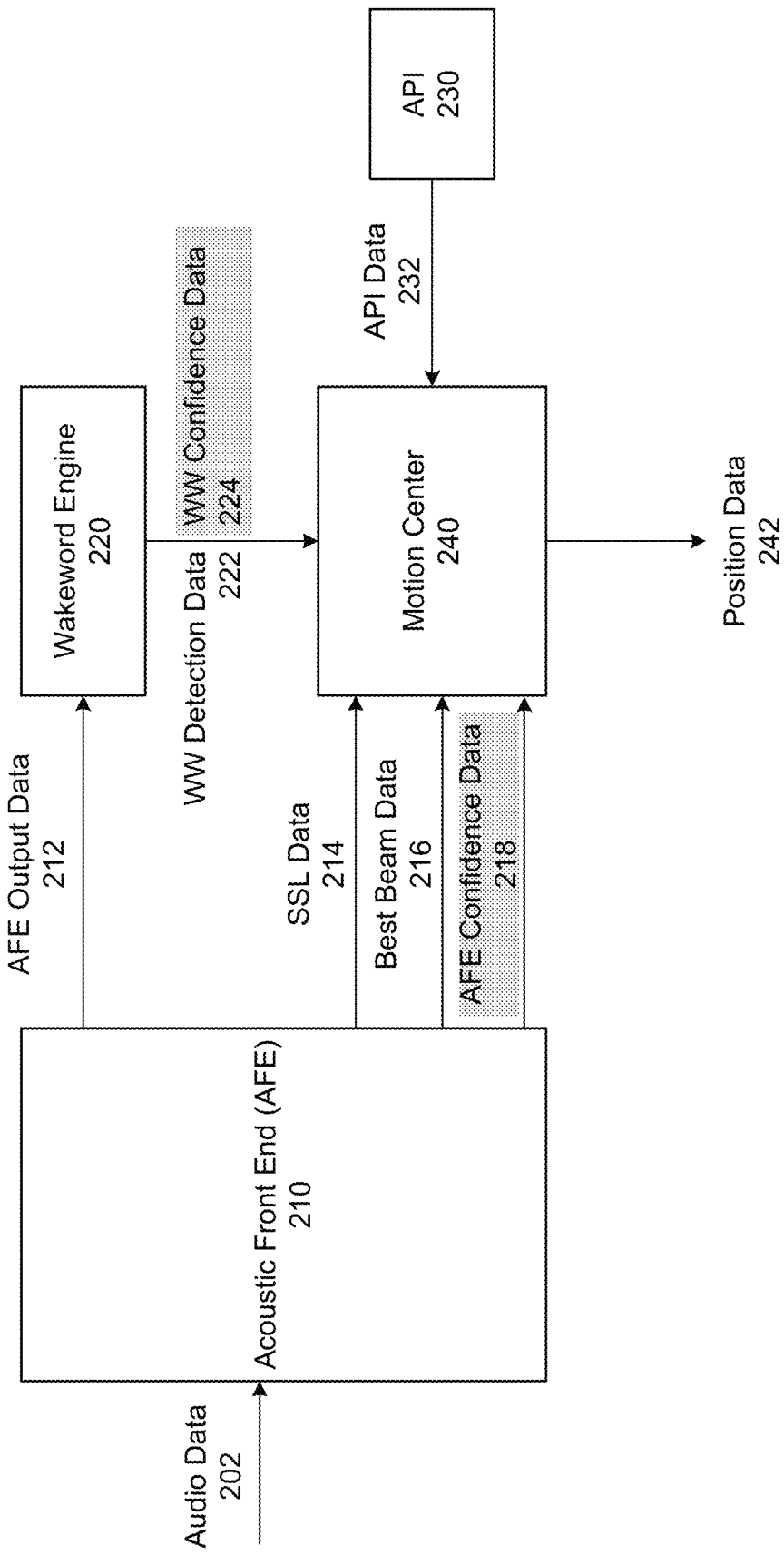

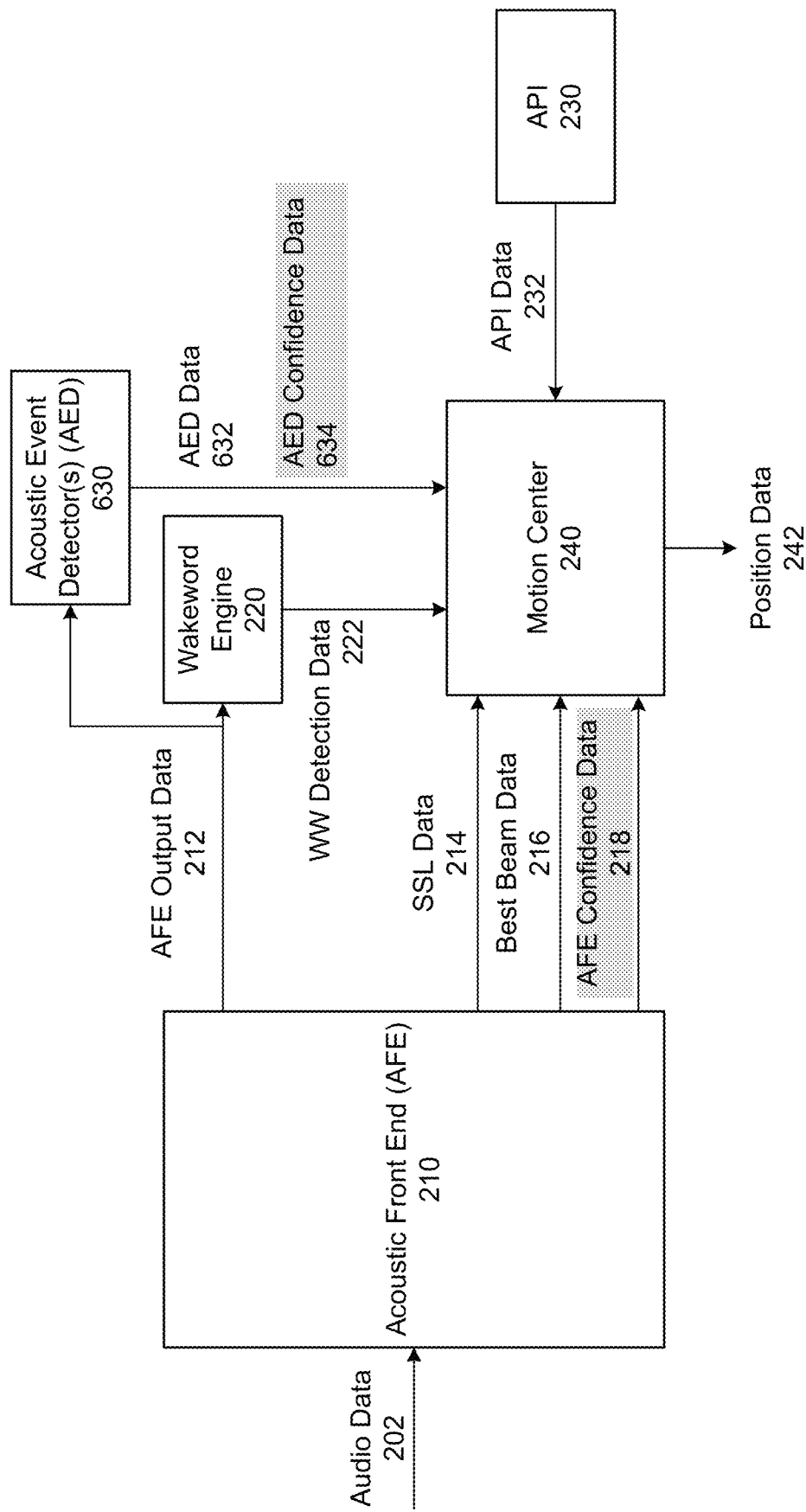

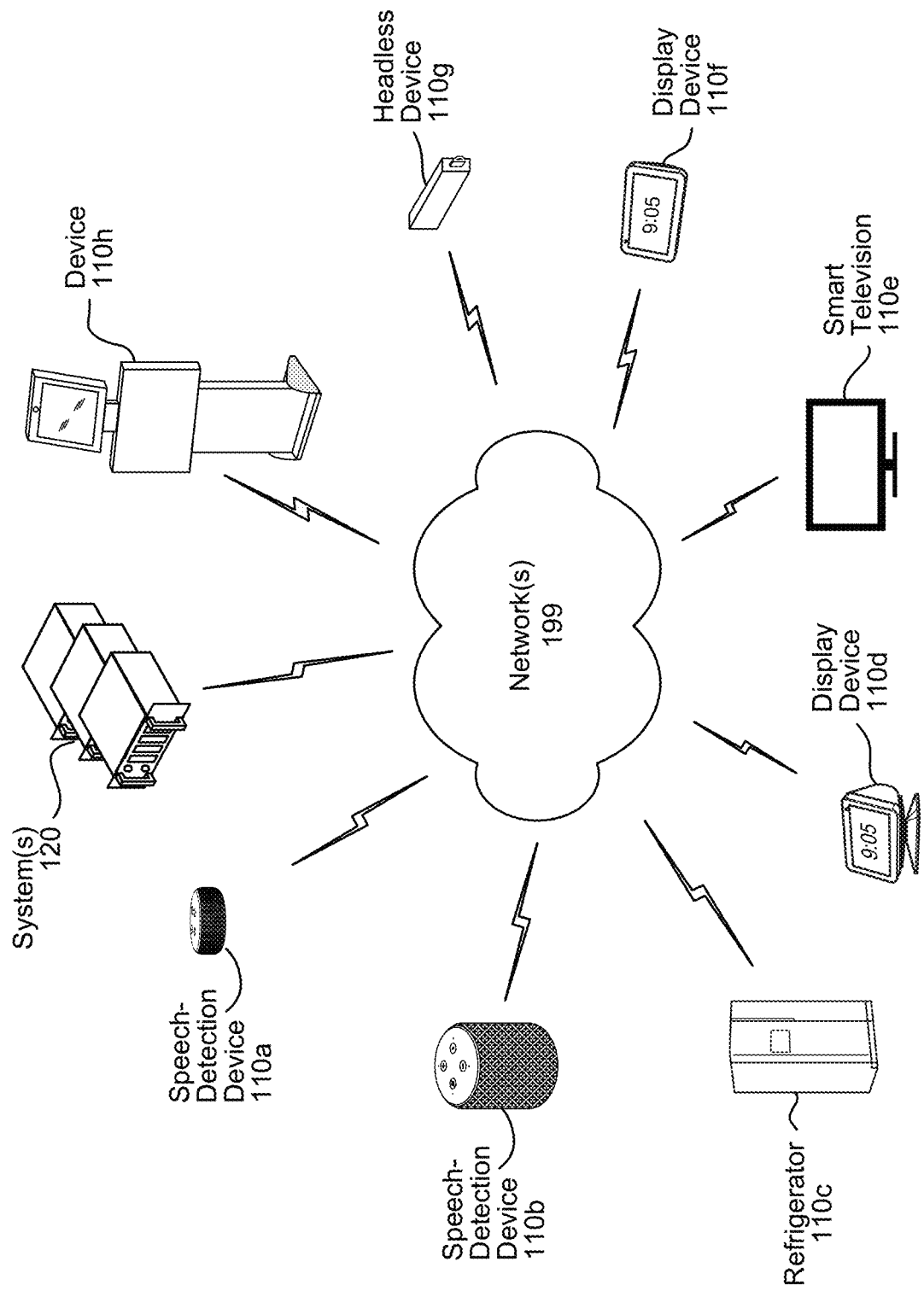

SOUND SOURCE LOCALIZATION AUDIO TYPE DETECTION

BACKGROUND

With the advancement of technology, the use and popularity of electronic devices has increased considerably. Electronic devices are commonly used to capture and process audio data.

BRIEF DESCRIPTION OF DRAWINGS

For a more complete understanding of the present disclosure, reference is now made to the following description taken in conjunction with the accompanying drawings.

FIGS. 2A-2C illustrate example component diagrams of an audio type detection system according to examples of the present disclosure.

FIGS. 6A-6B illustrate example component diagrams of an audio type detection system using acoustic event detectors according to examples of the present disclosure.

FIG. 11 illustrates an example of a computer network for use with a speech processing system.

DETAILED DESCRIPTION

Electronic devices may be used to capture audio and process audio data. The audio data may be used for voice commands and/or sent to a remote device as part of a communication session. To process voice commands from a particular user or to send audio data that only corresponds to the particular user, the device may attempt to isolate desired speech associated with the user from undesired speech associated with other users and/or other sources of noise, such as audio generated by loudspeaker(s) or ambient noise in an environment around the device. For example, the device may perform sound source localization to distinguish between multiple sound sources represented in the audio data. However, while the sound source localization separates the audio data based on the sound source, the device cannot tell which sound source is associated with the desired speech.

To improve sound source localization, devices, systems and methods are disclosed that perform audio type detection based on acoustic events. For example, the system may perform sound source localization (SSL) processing on input audio data to generate SSL data indicating multiple sound sources represented in the input audio data. In some examples, the system may identify an audio type corresponding to a sound source and/or track an individual sound source over time by determining a sound source having a strongest correlation to an acoustic event. For example, the system may include a wakeword detector configured to generate wakeword data indicating when a wakeword is represented in the input audio data. By determining correlation data between the wakeword data and a portion of the SSL data for each sound source, the system may identify the sound source that has the strongest correlation and may associate this sound source with the wakeword. Thus, the system may identify the sound source associated with desired speech and may use the SSL data to track this sound source over time. Additionally or alternatively, the system may include one or more acoustic event detectors and may detect additional acoustic events. The system may perform the same steps to identify a sound source most correlated with each of the acoustic events, enabling the system to identify an audio type corresponding to the sound sources.

Figure 1:
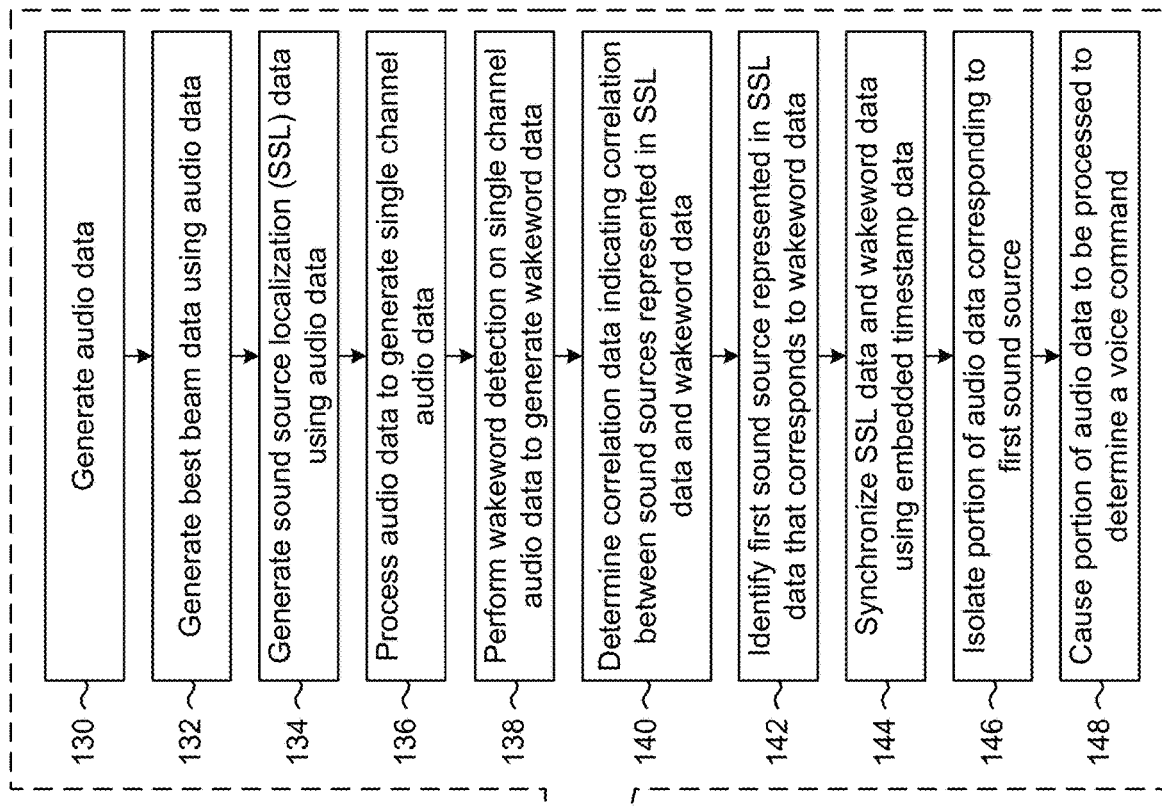
FIG. 1 illustrates a system configured to perform audio type detection according to embodiments of the present disclosure.
Figure 1:
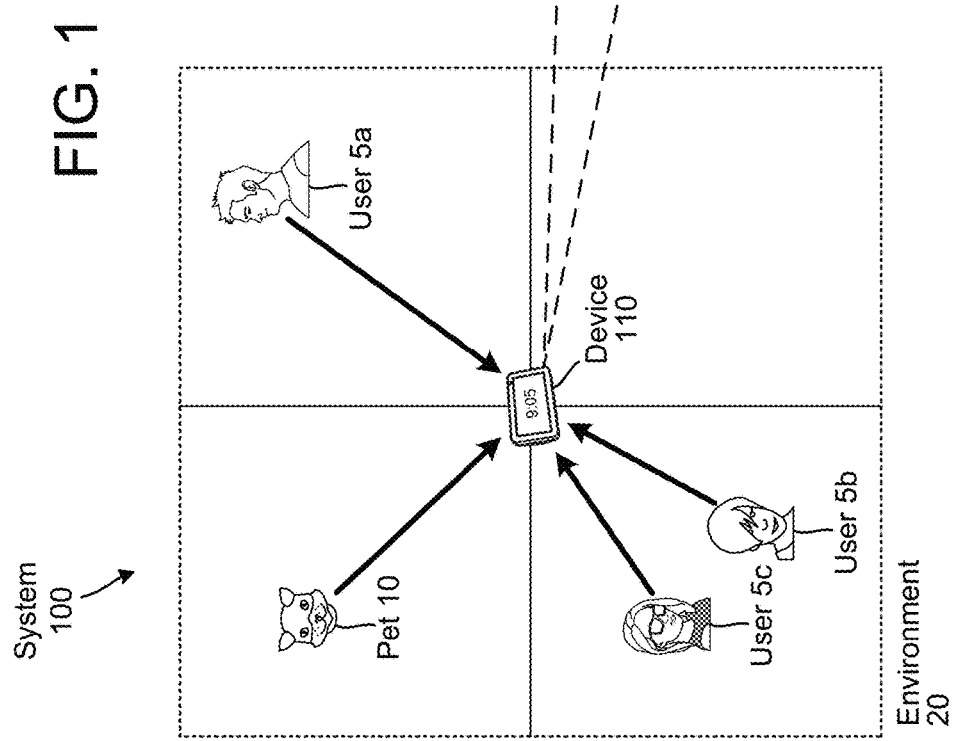

FIG. 1 illustrates a high-level conceptual block diagram of a system 100 configured to perform human presence detection and/or localization using a human keypoint detection (HKD) model and a false positive suppression model. Although FIG. 1, and other figures/discussion illustrate the operation of the system in a particular order, the steps described may be performed in a different order (as well as certain steps removed or added) without departing from the intent of the disclosure. As illustrated in FIG. 1, the system 100 may include a device 110 and server(s) 120 that may be communicatively coupled to network(s) 10.

The device 110 may be an electronic device configured to capture and/or receive audio data. For example, the device 110 may include a microphone array configured to generate audio data, although the disclosure is not limited thereto and the device 110 may include multiple microphones without departing from the disclosure. As is known and used herein, "capturing" an audio signal and/or generating audio data includes a microphone transducing audio waves (e.g., sound waves) of captured sound to an electrical signal and a codec digitizing the signal to generate the microphone audio data.

As illustrated in FIG. 1, an environment 20 of the device 110 may include four separate sound sources, although the disclosure is not limited thereto. For example, FIG. 1 illustrates that the environment 20 may include a first user 5a at a first location (e.g., first direction relative to the device 110), a second user 5b at a second location (e.g., second direction relative to the device 110), a third user 5c at a third location (e.g., third direction relative to the device 110), and a pet 10 at a fourth location (e.g., fourth direction relative to the device 110). At various times, each of the sound sources may generate audible noises that may be represented in the input audio data generated by the device 110.

To perform sound source localization audio type detection, the device 110 may generate (130) audio data using a microphone array and may generate (132) best beam data using the audio data. For example, the best beam data may indicate a "beam," direction, sound source, and/or the like associated with a strongest signal quality metric for a particular period of time. Thus, the best beam data may vary over time, but only indicates a single sound source and/or location corresponding to the strongest signal quality metric at a given time.

The device 110 may generate (134) sound source localization (SSL) data using the audio data. To illustrate an example, the device 110 may be configured to perform SSL processing on the audio data to generate SSL data corresponding to multiple sound sources. For example, the device 110 may determine that a first sound source is associated with a first location (e.g., first direction relative to the device 110) and the SSL data may indicate when an audible sound corresponding to the first location is represented in the input audio data. Thus, the SSL data may distinguish between multiple sound sources based on Time of Arrival (TOA) processing, Delay of Arrival (DOA) processing, and/or the like, enabling the device 110 to track the sound sources over time.

The device 110 may process (136) the audio data to generate single channel audio data. For example, the device 110 may process the audio data to reduce noise and other signals in order to isolate a speech signal represented in the audio data. Thus, the single channel audio data may correspond to a single channel with a higher signal to noise ratio (SNR) than the multi-channel audio data generated by the microphone array.

The device 110 may perform (138) wakeword detection on the single channel audio data to generate wakeword data. For example, the device 110 may include a wakeword detector configured to generate the wakeword data indicating when a wakeword is represented in the audio data. As described in greater detail below with regard to FIGS. 6A-6B, the disclosure is not limited thereto and the device 110 may perform acoustic event detection without departing from the disclosure.

The device 110 may determine (140) correlation data indicating a correlation between sound sources represented in the SSL data and the wakeword data and may identify (142) a first sound source represented in the SSL data that corresponds to the wakeword data. For example, the device 110 may determine which sound source has a strongest correlation with the wakeword data, indicating that the selected sound source generated the wakeword represented in the audio data.

The device 110 may synchronize (144) the SSL data and the wakeword data using embedded timestamp data. As described in greater detail below with regard to FIGS. 2A-2C, the device 110 may generate a global timestamp (e.g., timestamp data) and may use this timestamp data to synchronize the SSL data, the wakeword data, and/or other data generated by the device 110. For example, the device 110 may embed the timestamp data in the SSL data, the single channel audio data, and/or the wakeword data, enabling an individual component to access the timestamp data even if the individual component has an internal clock, generates second timestamp data, and/or the like. This enables multiple components of the device 110 to maintain a consistent global reference so that the various inputs are aligned prior to determining the correlation data.

By determining correlation data between the wakeword data and a portion of the SSL data for each sound source, the system may identify the sound source that has the strongest correlation and may associate this sound source with the wakeword. Thus, the system may identify the sound source associated with desired speech and may use the SSL data to track this sound source over time. For example, the device 110 may isolate (146) a portion of the audio data corresponding to the first sound source and may cause (148) the portion of the audio data to be processed to determine a voice command. In some examples, the device 110 may be configured to perform natural language processing to determine the voice command and may perform an action corresponding to the voice command. However, the disclosure is not limited thereto and in other examples the device 110 may be configured to send the portion of the audio data to a natural language processing system to determine the voice command without departing from the disclosure.

Figure 2A:
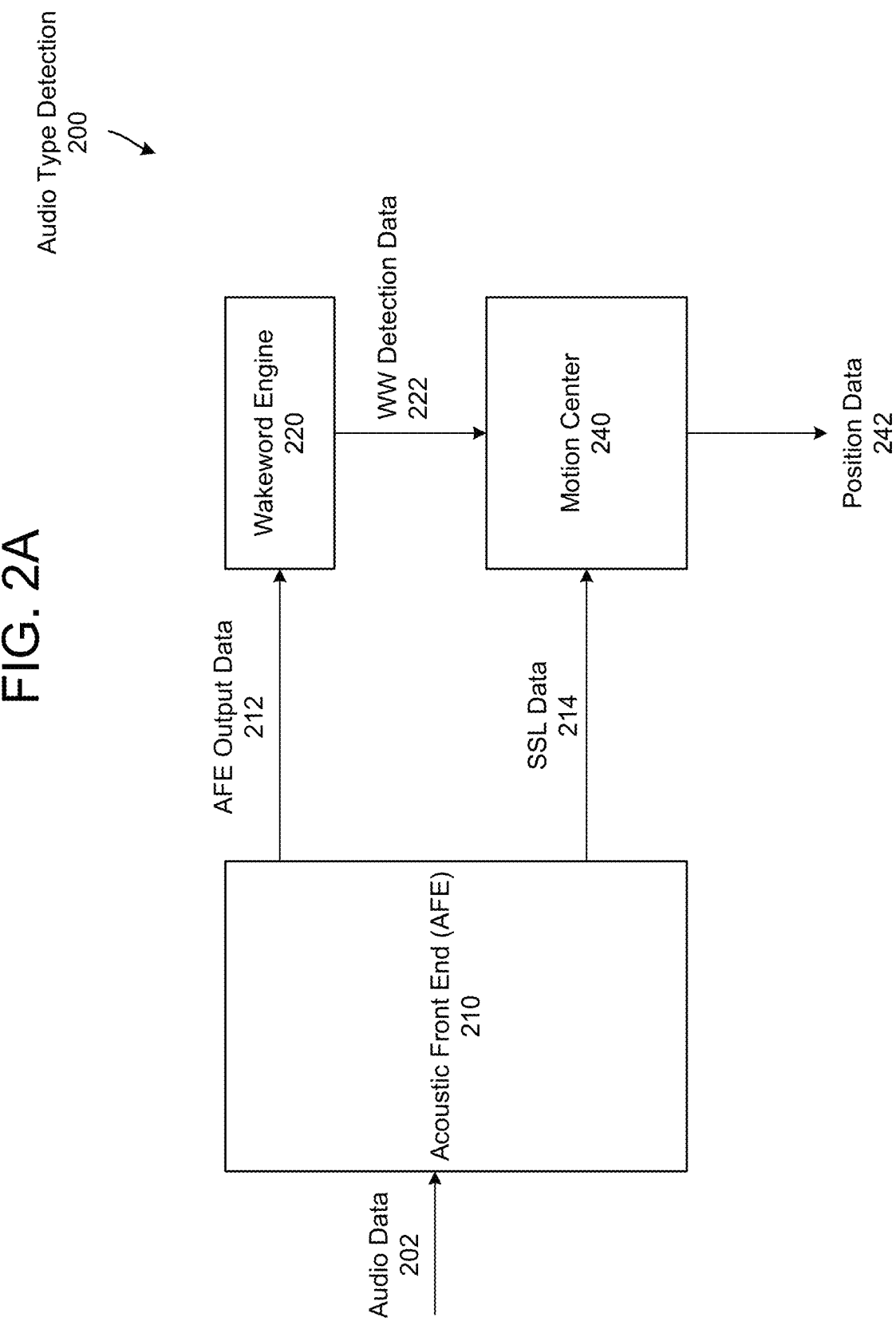

FIGS. 2A-2C illustrate example component diagrams of an audio type detection system according to examples of the present disclosure. As illustrated in FIG. 2A, the device 110 may perform audio type detection 200 using an acoustic front end (AFE) component 210 that is configured to generate multiple types of output data. For example, the AFE component 210 may receive audio data 202 and generate AFE output data 212, sound source localization (SSL) data 214, and/or additional output data such as best beam data 216, which will be described below with regard to FIG. 2B, and/or AFE confidence data 218, which will be described below with regard to FIG. 2C.

The audio data 202 may be generated by a microphone array of the device 110 and therefore may correspond to multiple channels. For example, if the microphone array includes eight individual microphones, the audio data 202 may include eight individual channels. To improve audio processing of subsequent components, such as a wakeword engine component 220, the AFE component 210 may process the multi-channel audio data 202 to generate a single channel output. For example, the AFE component 210 may process the audio data 202 to reduce noise and other signals in order to isolate a speech signal represented in the audio data 202. Thus, the AFE output data 212 may correspond to a single channel with a higher signal to noise ratio (SNR) than the audio data 202.

In addition to the AFE output data 212, the AFE component 210 may generate the SSL data 214. For example, the AFE component 210 may perform sound source localization processing to separate the audio data 202 based on sound source and indicate when an individual sound source is represented in the audio data 202. To illustrate an example, the AFE component 210 may detect a first sound source (e.g., first portion of the audio data corresponding to a first direction relative to the device 110) during a first time range, a second sound source (e.g., second portion of the audio data corresponding to a second direction relative to the device 110) during a second time range, and so on. Thus, the SSL data 214 may include a first portion or first SSL data indicating when the first sound source is detected, a second portion or second SSL data indicating when the second sound source is detected, and so on. The AFE component 210 may use Time of Arrival (TOA) processing, Delay of Arrival (DOA) processing, and/or the like to determine the SSL data 214, although the disclosure is not limited thereto. In some examples, the SSL data 214 may include multiple SSL tracks (e.g., individual SSL track for each unique sound source represented in the audio data 202), along with additional information for each of the individual SSL tracks. For example, for a first SSL track corresponding to a first sound source (e.g., audio source), the SSL data 214 may indicate a position and/or direction associated with the first sound source location, a signal quality metric (e.g., power value) associated with the first SSL track, and/or the like, although the disclosure is not limited thereto.

As illustrated in FIG. 2A, the AFE component 210 may output the AFE output data 212 to a wakeword engine 220. For example, the wakeword engine 220 may be configured to process the AFE output data 212 (e.g., single channel audio data) to determine whether a wakeword is detected in the AFE output data 212. However, the wakeword engine 220 is only intended to conceptually illustrate an example and the disclosure is not limited thereto. Instead, the AFE component 210 may send the AFE output data 212 to a different component (e.g., an acoustic event detector), to multiple components (e.g., the wakeword engine 220 and/or one or more acoustic event detectors), and/or the like without departing from the disclosure.

In the example illustrated in FIG. 2A, the AFE component 210 may send the AFE output data 212 to the wakeword engine 220 and the wakeword engine 220 may generate wakeword (WW) detection data 222 indicating when a wakeword is detected in the AFE output data 212 (and therefore represented in the audio data 202). As will be described in greater detail below with regard to FIG. 4, the WW detection data 222 may indicate a start time and an end time for each wakeword detected in the AFE output data 212. Thus, a motion center component 240 may receive the WW detection data 222 and associate an individual wakeword with a sound source based on the SSL data 214.

As represented by the audio type detection 200 illustrated in FIG. 2A, the motion center component 240 may receive the SSL data 214 from the AFE component 210 and the WW detection data 222 from the wakeword engine 220. While not illustrated in FIG. 2A, the AFE component 210 may generate timestamp data corresponding to a series of timestamps using a global clock signal. The AFE component 210 may expose the timestamp data to the other components (e.g., the wakeword engine 220, the motion center component 240, and/or additional components) and the device 110 may synchronize the data generated by each of these components using the timestamp data. For example, the device 110 may associate a portion of the SSL data 214 that corresponds to a first timestamp with a portion of the WW detection data 222 that corresponds to the first timestamp. Thus, the device 110 may align a timeline between each of the components using the timestamp data generated by the AFE component 210.

While the device 110 may align the timeline between each of the components (e.g., synchronize data generated by each of these components using the global clock signal), the components may exhibit different and/or varying propagation delays and other processing delays. As a result, the information represented in the SSL data 214, and/or the WW detection data 222 may correspond to a single event but may be associated with different timestamps. For example, in response to a user saying the wakeword, the WW detection data 222 may indicate that a wakeword is represented during a first time range, while the SSL data 214 may indicate that an audible sound associated with a first sound source is detected during a second time range that is slightly different than the first time range. Therefore, the WW detection data 222 may not align perfectly with audible sounds represented in the SSL data 214.

The motion center 240 is configured to process the SSL data 214 and the WW detection data 222 to generate position data 242 corresponding to the sound sources. For example, the motion center 240 may be configured to track a sound source over time, collecting information about the sound source and maintaining a position of the sound source relative to the device 110. Thus, the motion center 240 may enable the device 110 to track the sound source even as the device 110 and/or the sound source move relative to each other. In some examples, the position data 242 may include a unique identification indicating an individual sound source, along with information about a position of the sound source relative to the device 110, a location of the sound source using a coordinate system or the like, an audio type associated with the sound source, additional information about the sound source (e.g., user identification, type of sound source, etc.), and/or the like, although the disclosure is not limited thereto.

As will be described in greater detail below, the motion center 240 may use the SSL data 214 and the WW detection data 222 to perform sound source localization audio type detection. For example, the motion center 240 may determine a correlation between the WW detection data 222 a portion of the SSL data 214 corresponding to a sound source in order to identify the sound source associated with the wakeword.

While FIG. 2A illustrates a simple example of the audio type detection 200, the disclosure is not limited thereto. For example, FIG. 2B illustrates an example of audio type detection 250 that includes the best beam data 216 generated by the AFE component 210. While the SSL data 214 may include separate SSL data for each individual sound source represented in the audio data 202, the best beam data 216 only corresponds to a single "beam" at a time, indicating a direction that corresponds to a strongest signal for a particular time range. For example, the AFE component 210 may generate the best beam data 216 by identifying a strongest signal quality metric (e.g., signal-to-noise ratio (SNR) value, energy value, etc.) of sound sources represented in the audio data 202 and determining a direction associated with the strongest signal quality metric. While the AFE component 210 only selects a single beam at a time, the best beam selected by the AFE component 210 may vary over time without departing from the disclosure, indicating which sound source is strongest at a given time.

In addition to optionally generating the best beam data 216, in some examples the device 110 may include an application programming interface (API) component 230 that may be configured to generate API data 232, as illustrated in FIG. 2B. To illustrate an example, the API component 230 may correspond to computer vision and the API data 232 may include additional information about the sound source(s) that is generated by processing image data. For example, the API component 230 may perform object recognition to identify a type of object represented in image data, may perform human detection to determine that a human is represented in the image data and/or a location of the human, may perform facial recognition to determine an identity of the human represented in the image data, and/or the like without departing from the disclosure. However, the disclosure is not limited thereto and the API data 232 may vary without departing from the disclosure.

As represented by the audio type detection 250 illustrated in FIG. 2B, the motion center component 240 may receive the SSL data 214 and the best beam data 216 from the AFE component 210, the WW detection data 222 from the wakeword engine 220, and/or the API data 232 from the API component 230. While FIG. 2B illustrates a single API component 230, the disclosure is not limited thereto and the motion center 240 may receive API data 232 from multiple API components 230 without departing from the disclosure.

As discussed above with regard to FIG. 2A, the AFE component 210 may generate timestamp data corresponding to a series of timestamps using a global clock signal. Thus, the AFE component 210 may embed the timestamp data in the best beam data 216 and/or expose the timestamp data to the API component 230 to enable the device 110 to synchronize multiple components using the timestamp data.

While the device 110 may align the timeline between each of the components (e.g., synchronize data generated by each of these components using the global clock signal), the components may exhibit different and/or varying propagation delays and other processing delays. As a result, the information represented in the SSL data 214, the best beam data 216, the WW detection data 222, and/or the API data 232 may correspond to a single event but may be associated with different timestamps. For example, in response to a user saying the wakeword, the WW detection data 222 may indicate that a wakeword is represented during a first time range, while the SSL data 214 may indicate that an audible sound associated with a first sound source is detected during a second time range that is slightly different than the first time range. Therefore, the WW detection data 222 may not align perfectly with audible sounds represented in the SSL data 214.

In the audio type detection 250 example illustrated in FIG. 2B, the motion center 240 is configured to process the SSL data 214, the best beam data 216, the WW detection data 222, and/or the API data 232 to generate the position data 242 corresponding to the sound sources. Thus, the motion center 240 may be configured to track a sound source over time as described above with regard to FIG. 2A.

In some examples, the device 110 may determine confidence score data corresponding to the SSL data 214 and/or the WW detection data 222. For example, FIG. 2C illustrates an example of the device 110 performing audio type detection 260 in which the AFE component 210 may generate AFE confidence data 218 corresponding to the SSL data 214 and/or the wakeword engine 220 may generate WW confidence data 224 corresponding to the WW detection data 222. While FIG. 2C illustrates an example of the device 110 generating both the AFE confidence data 218 and the WW confidence data 224, the disclosure is not limited thereto and the device 110 may generate the AFE confidence data 218 or the WW confidence data 224 without departing from the disclosure. Additionally or alternatively, while FIG. 2C illustrates an example of the device 110 generating the AFE confidence data 218 and the WW confidence data 224 in addition to the best beam data 216 and/or the API data 232, the disclosure is not limited thereto and the device 110 may generate any combination of the best beam data 216, the AFE confidence data 218, the WW confidence data 224, and/or the API data 232 without departing from the disclosure.

As illustrated in FIG. 2C, the AFE component 210 may generate AFE confidence data 218 and send the AFE confidence data 218 to the motion center 240. The AFE confidence data 218 may indicate a likelihood that an individual SSL track (e.g., separate SSL data for each individual sound source represented in the audio data 202) corresponds to a particular noise or sound (e.g., wakeword event, speech, acoustic event, etc.).

In some examples, the AFE confidence data 218 may indicate a likelihood that each individual SSL track corresponds to a particular noise or acoustic event. To illustrate a simple example, each of the SSL tracks may have a unique AFE confidence score indicating a probability that the SSL track corresponds to a single acoustic event, such as speech. Thus, if the SSL data 214 identifies four unique sound sources, the AFE confidence data 218 may include four confidence values indicating a likelihood that each of the four unique sound sources corresponds to speech. However, the disclosure is not limited thereto and the AFE confidence score may generate confidence values for multiple acoustic events without departing from the disclosure. In some examples, the AFE confidence data 218 may include confidence values for each individual SSL track and for each acoustic event being tracked (e.g., wakeword event, speech, pet noises, mechanical noises, etc.). For example, if the device 110 is tracking speech and one acoustic event (e.g., pet noises), each of the SSL tracks may be associated with two unique AFE confidence scores; a first AFE confidence score indicating a first probability that the SSL track corresponds to a first acoustic event (e.g., speech) and a second AFE confidence score indicating a second probability that the SSL track corresponds to a second acoustic event (e.g., animal noises, pet noises, and/or the like). Thus, if the SSL data 214 identifies four unique sound sources, the AFE confidence data 218 may include eight confidence values indicating a likelihood that each of the four unique sound sources corresponds to the first acoustic event or the second acoustic event.

The disclosure is not limited thereto, however, and in some examples the AFE confidence data 218 may only include a single confidence score for each of the unique sound sources without departing from the disclosure. For example, if the AFE component 210 is configured to detect multiple acoustic events, the AFE confidence data 218 may indicate a highest confidence score and corresponding acoustic event that is associated with each of the unique sound sources. To illustrate an example, the AFE component 210 may be configured to detect four separate types of acoustic events; a wakeword, speech, pet noises, and mechanical noises. Thus, if the SSL data 214 identifies four unique sound sources, the AFE confidence data 218 may include four confidence values, with a first confidence value indicating a likelihood that a first sound source corresponds to a first acoustic event (e.g., wakeword event), a second confidence value indicating a likelihood that a second sound source corresponds to a second acoustic event (e.g., speech), a third confidence value indicating a likelihood that a third sound source corresponds to the second acoustic event (e.g., speech), and a fourth confidence value indicating a likelihood that a fourth sound source corresponds to a third acoustic event (e.g., pet noises). Thus, instead of including sixteen separate confidence values (e.g., likelihood that a single sound source corresponds to each of the four types of acoustic events), the AFE confidence data 218 may only include four confidence values identifying the most likely type of acoustic event for each of the sound sources without departing from the disclosure.

As illustrated in FIG. 2C, in some examples the wakeword engine 220 may generate wakeword (WW) confidence data 224 and send the WW confidence data 224 to the motion center 240. The WW confidence data 224 may indicate a likelihood that a wakeword is represented in the AFE output data 212. In some examples, the WW confidence data 224 may include an individual confidence score for each wakeword event (e.g., period of time in which the wakeword engine 220 indicates that a single wakeword is represented in the AFE output data 212). For example, the wakeword engine 220 may distinguish between a first wakeword event having a first confidence score (e.g., first likelihood that a wakeword is represented in a first portion of the audio data 202) and a second wakeword event having a second confidence score (e.g., second likelihood that a wakeword is represented in a second portion of the audio data 202). However, the disclosure is not limited thereto, and the WW confidence data 224 may include a plurality of confidence scores without departing from the disclosure. For example, the wakeword engine 220 may generate WW confidence data 224 that includes periodic confidence scores, such as an individual confidence score for each individual audio frame, for a predetermined period of time, and/or the like without departing from the disclosure.

As represented by the audio type detection 260 illustrated in FIG. 2C, the motion center component 240 may receive the SSL data 214, the best beam data 216, and/or the AFE confidence data 218 from the AFE component 210, the WW detection data 222 and/or the WW confidence data 224 from the wakeword engine 220, and/or the API data 232 from the API component 230. While FIG. 2C illustrates a single API component 230, the disclosure is not limited thereto and the motion center 240 may receive API data 232 from multiple API components 230 without departing from the disclosure.

As discussed above with regard to FIG. 2A, the AFE component 210 may generate timestamp data corresponding to a series of timestamps using a global clock signal. Thus, the AFE component 210 may embed the timestamp data in the AFE output data 212 and the AFE confidence data 218 and/or expose the timestamp data to the wakeword engine 220 to enable the device 110 to synchronize multiple components using the timestamp data. While the device 110 may align the timeline between each of the components (e.g., synchronize data generated by each of these components using the global clock signal), the components may exhibit different and/or varying propagation delays and other processing delays. As a result, the information represented in the SSL data 214, the best beam data 216, the AFE confidence data 218, the WW detection data 222, the WW confidence data 224, and/or the API data 232 may correspond to a single event but may be associated with different timestamps. For example, in response to a user saying the wakeword, the WW detection data 222 may indicate that a wakeword is represented during a first time range, while the SSL data 214 may indicate that an audible sound associated with a first sound source is detected during a second time range that is slightly different than the first time range. Therefore, the WW detection data 222 may not align perfectly with audible sounds represented in the SSL data 214.

In the audio type detection 260 example illustrated in FIG. 2C, the motion center 240 is configured to process the SSL data 214, the best beam data 216, the AFE confidence data 218, the WW detection data 222, the WW confidence data 224, and/or the API data 232 to generate the position data 242 corresponding to the sound sources. Thus, the motion center 240 may be configured to track a sound source over time as described above with regard to FIG. 2A without departing from the disclosure. For example, the motion center 240 may enable the device 110 to track the sound source even as the device 110 and/or the sound source move relative to each other. In some examples, the position data 242 may include a unique identification indicating an individual sound source, along with information about a position of the sound source relative to the device 110, a location of the sound source using a coordinate system or the like, an audio type associated with the sound source, additional information about the sound source (e.g., user identification, type of sound source, etc.), and/or the like, although the disclosure is not limited thereto.

As described in greater detail below with regard to FIG. 3B, in some examples the motion center 240 may generate the position data 242 by calculating correlation data between each of the individual SSL tracks and the WW detection data 222. For example, the device 110 may calculate first correlation data that includes correlation values (e.g., ranging from 0.0 to 1.0) indicating a similarity between each of the individual SSL tracks and a first wakeword event represented in the WW detection data 222. The motion center 240 may then use the first correlation data to determine which of the individual SSL tracks corresponds to the first wakeword event. For example, if the first correlation data includes a first correlation value (e.g., 0.88) associated with a first sound source and a second correlation value (e.g., 0.33) associated with a second sound source, the motion center 240 may determine that the first correlation value is a highest correlation value included in the first correlation data and associate the first sound source with the first wakeword event.

In some examples, the motion center 240 may generate the position data 242 using both the SSL data 214 and the AFE confidence data 218 described above. For example, if the AFE confidence data 218 indicates a likelihood that an individual SSL track corresponds to a particular acoustic event (e.g., wakeword event, speech, etc.), the motion center 240 may generate the first correlation data described above and then generate second correlation data using a weighted sum of the first correlation data and the AFE confidence data 218, although the disclosure is not limited thereto. For example, if the first correlation data includes a first correlation value (e.g., 0.88) associated with a first sound source and a second correlation value (e.g., 0.33) associated with a second sound source, and the AFE confidence data 218 includes a first confidence value (e.g., 0.75) associated with the first sound source and a second confidence value (e.g., 0.5) associated with the second sound source, the motion center 240 may generate second correlation data including a first value (e.g., 0.88*0.75=0.66) corresponding to the first sound source and a second value (e.g., 0.33*0.5=0.167) corresponding to the second sound source. Thus, the motion center 240 may determine that the first value is a highest value included in the second correlation data and associate the first sound source with the first wakeword event. However, this example is intended to conceptually illustrate a simple example and the disclosure is not limited thereto.

In other examples, the motion center 240 may include a machine learning model, such as a deep neural network (DNN) or the like, without departing from the disclosure. For example, the motion center 240 may be configured to process the SSL data 214, the best beam data 216, the AFE confidence data 218, the WW detection data 222, the WW confidence data 224, the API data 232, and/or additional data using the machine learning model to generate the position data 242 corresponding to the sound sources.

To illustrate a simple example, the motion center 240 may generate the first correlation data using the SSL data 214 and the WW detection data 222, as described above, and may input the first correlation data and the AFE confidence data 218 to the machine learning model. Instead of generating the weighted sum described above, however, the machine learning model may generate output confidence data including confidence scores for each of the individual SSL tracks. In this example, the motion center 240 may determine that a first output confidence value corresponding to the first sound source is a highest output confidence value of the output confidence data and associate the first sound source with the first wakeword event. The disclosure is not limited thereto, however, and in other examples the machine learning model may generate output data without the motion center 240 calculating the first correlation data without departing from the disclosure.

To illustrate another example, the motion center 240 may input the SSL data 214, the best beam data 216, the AFE confidence data 218, the WW detection data 222, the WW confidence data 224, and/or the API data 232 to the machine learning model to generate the output data. The output data may correspond to correlation values (e.g., similarity between each of the SSL tracks and the WW detection data 222 during the wakeword event), confidence values (e.g., likelihood that each of the SSL tracks corresponds to the wakeword event), SSL type data (e.g., indicating a type of acoustic event associated with each of the SSL tracks), and/or the like without departing from the disclosure.

Figure 3A:
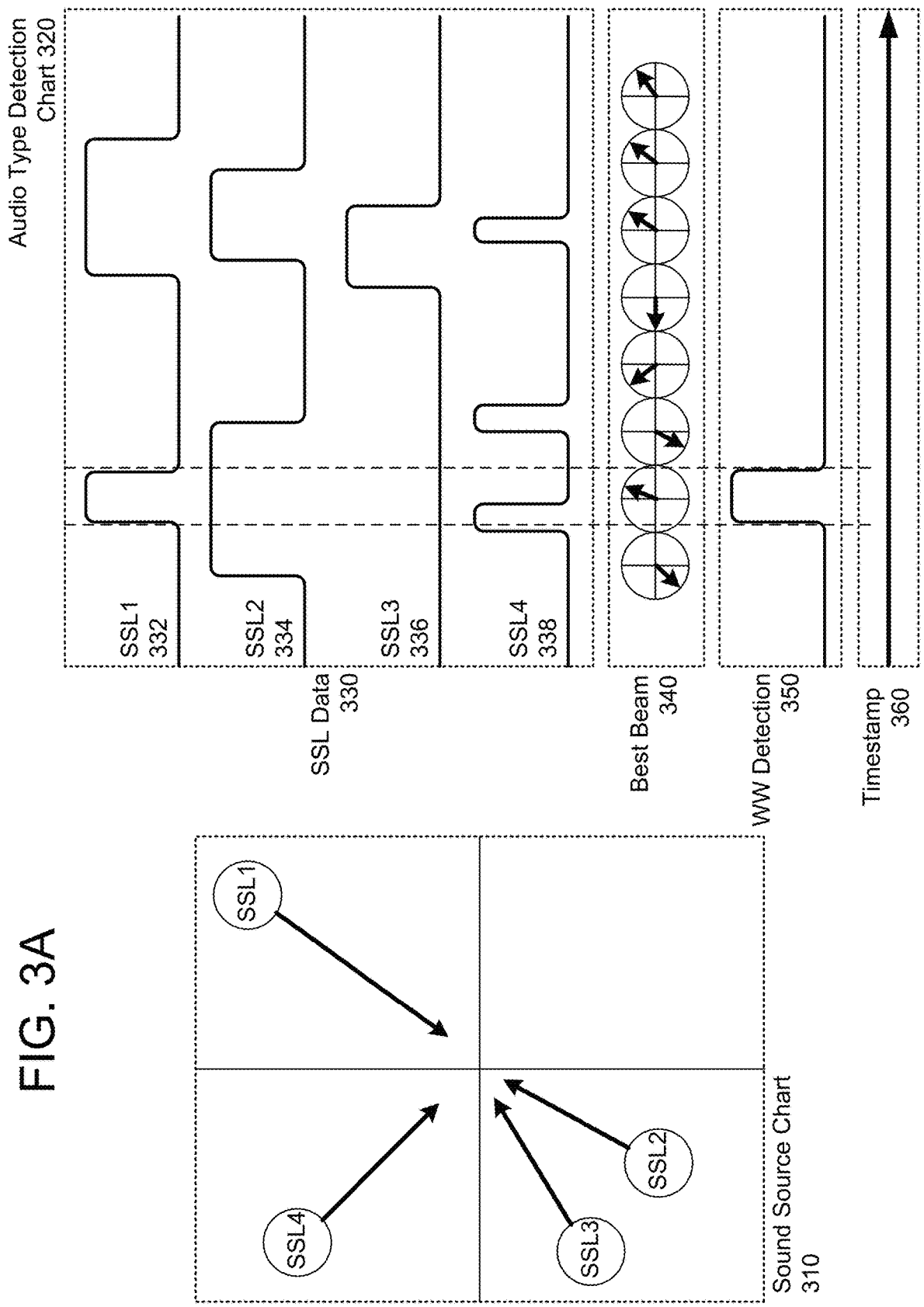
FIGS. 3A-3B illustrate an example of performing sound source localization audio type detection according to examples of the present disclosure.
Figure 3B:
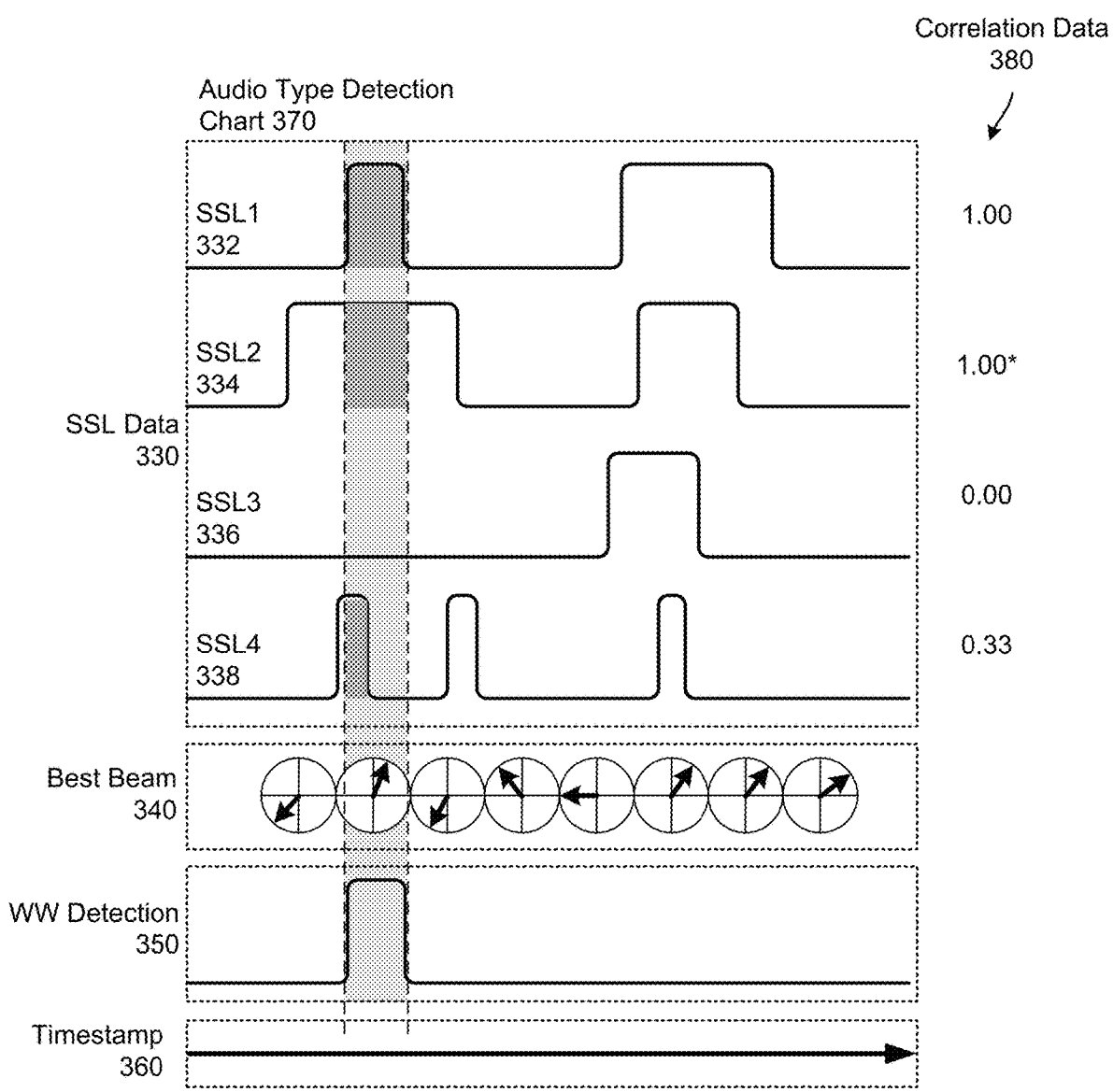

FIGS. 3A-3B illustrate an example of performing sound source localization audio type detection according to examples of the present disclosure. As illustrated in FIG. 3A, the environment 20 described above with regard to FIG. 1 is represented by sound source chart 310, which depicts four different sound source locations relative to the device 110. Thus, the device 110 may generate SSL data 330 that distinguishes between individual sound sources in the environment 20 and represents each of the sound sources based on a corresponding location. For example, the device 110 may identify a first sound source location (e.g., SSL1) corresponding to the first user 5a and generate first SSL data 332 (e.g., a first portion of the SSL data 330) corresponding to first speech generated by the first user 5a, identify a second sound source location (e.g., SSL2) corresponding to the second user 5b and generate second SSL data 334 (e.g., a second portion of the SSL data 330) corresponding to second speech generated by the second user 5b, identify a third sound source location (e.g., SSL3) corresponding to the third user 5c and generate third SSL data 336 (e.g., a third portion of the SSL data 330) corresponding to third speech generated by the third user 5c, and identify a fourth sound source location (e.g., SSL4) corresponding to the pet 10 and generate fourth SSL data 338 (e.g., a fourth portion of the SSL data 330) corresponding to audible noises (e.g., barking, growling, etc.) generated by the pet 10.

To illustrate a simple example of performing audio type detection, FIG. 3A includes audio type detection chart 320. As illustrated in FIG. 3A, the audio type detection chart 320 illustrates the SSL data 330 mentioned above along with best beam data 340 and WW detection data 350, which are aligned with each other using timestamp data 360 generated by the AFE component 210.

As illustrated in the audio type detection chart 320, a first binary value (e.g., 0) indicates that a signal is not represented in the audio data, while a second binary value (e.g., 1) indicates that the signal is represented in the audio data. Thus, the SSL1 data 332 may include a short pulse and a long pulse, which corresponds to the first user 5a speaking twice (e.g., for a short length of time during a first time range and then for a longer length of time during a second time range). Similarly, the SSL2 data 334 includes a long pulse and a medium pulse, which corresponds to the second user 5b speaking twice (e.g., for a longer length of time during the first time range and then for a medium length of time during the second time range). In contrast, the SSL3 data 336 only includes a single medium pulse, which corresponds to the third user 5c speaking once (e.g., for a medium length of time during the second time range). Finally, the SSL4 data 338 includes three short pulses, which corresponds to the pet 10 barking three times (e.g., twice during the first time range and once during the second time range).

As illustrated in the audio type detection chart 320, some of the sounds may overlap in time. For example, the first user 5a and the second user 5b speak at the same time during the first time range, while the pet 10 interrupts portions of this speech with barking. In addition, the first user 5a, the second user 5b, and the third user 5c speak at the same time during the second time range, which the pet 10 also interrupts with barking.

In the audio type detection illustrated in FIG. 3A, the device 110 may associate one of the sound sources with the wakeword represented in the WW detection data 350. For example, the device 110 may identify which sound source is present at the same time as the wakeword represented in the WW detection data 350 and associate this sound source with human speech and/or a voice command. Due to the overlapping signals, the propagation delays, and/or other processing delays mentioned above, however, the device 110 cannot easily identify which of the sound sources corresponds to the WW detection data 350.

To perform sound source localization audio type detection, the device 110 may determine a correlation between each of the sound sources and the WW detection data 350. For example, the device 110 may determine first correlation data corresponding to a first correlation between the SSL1 data 332 and the WW detection data 350, second correlation data corresponding to a second correlation between the SSL2 data 334 and the WW detection data 350, third correlation data corresponding to a third correlation between the SSL3 data 336 and the WW detection data 350, and fourth correlation data corresponding to a fourth correlation between the SSL4 data 338 and the WW detection data 350. After determining the correlation data, the device 110 may determine which of the sound sources is most similar to the WW detection data 350 (e.g., strongest correlation represented in the correlation data) and may associate the selected sound source with the wakeword.

In the example illustrated in FIG. 3A, the correlation data indicates a similarity between the WW detection data 350 and the SSL data 330 during a first time window in which the wakeword is detected, which corresponds to the pulse represented in the WW detection data 350. FIG. 3B illustrates audio type detection chart 370, which visually illustrates an example of how the device 110 may determine correlation data 380.

As illustrated in FIG. 3B, the first time window corresponding to the pulse represented in the WW detection data 350 is highlighted using shades of gray. For each individual portion of the SSL data 330 and each timestamp within the first time window, the device 110 may perform a mathematical operation to compare a first value of the portion of the SSL data 330 to a second value of the WW detection data 350 at the timestamp. For example, the device 110 may perform an "exclusive or" XOR (e.g., exclusive disjunction) operation between the first value of the SSL1 data 332 and the second value of the WW detection data 350, although the disclosure is not limited thereto and the device 110 may perform other operations without departing from the disclosure.

As used herein, an XOR operation compares the first value to the second value to identify when they are different. For example, the XOR operation may result in a first binary value (e.g., 0) when the first value is equal to the second value (e.g., both the first value and the second value have a value of zero or a value of one) and may result in a second binary value (e.g., 1) when the first value is different than the second value (e.g., the first value is equal to zero and the second value is equal to one, or the first value is equal to one and the second value is equal to zero). This is illustrated in the XOR truth table, shown below.

TABLE 1

XOR Truth Table

| INPUT | | |
|---|---|---|
| A | B | OUTPUT |
| 0 | 0 | 0 |
| 0 | 1 | 1 |
| 1 | 0 | 1 |
| 1 | 1 | 0 |

As illustrated in FIG. 3B, the audio type detection chart 370 represents the first binary value (e.g., 0) using a dark shade of gray and represents the second binary value (e.g., 1) using a light shade of gray. For example, the SSL1 data 332 is equal to the WW detection data 350 for an entirety of the first time window, resulting in the SSL1 data 332 being represented using the dark shade of gray throughout the first time window. Similarly, the SSL2 data 334 is also equal to the WW detection data 350 for the entirety of the first time window, resulting in the SSL2 data 334 also being represented using the dark shade of gray throughout the first time window. In contrast, the SSL3 data 336 is different than the WW detection data 350 for the entirety of the first time window, resulting in the SSL3 data 336 being represented using the light shade of gray throughout the first time window. Finally, the SSL4 data 338 is equal to the WW detection data 350 for a short portion of the first time window (e.g., one third), resulting in the SSL4 data 338 being represented using the dark shade of gray for a first third of the first time window and the light shade of gray for the second third and the final third of the first time window.

FIG. 3B illustrates a simple example of calculating the correlation data 380 based entirely on the XOR operation described above. As illustrated in FIG. 3B, a first portion of the correlation data 380 corresponds to a first correlation value (e.g., 1.0), indicating that the SSL1 data 332 is strongly correlated with the WW detection data 350 during the first time window in which the wakeword is represented. Similarly, a second portion of the correlation data 380 corresponds to a second correlation value (e.g., 1.0*), indicating that the SSL2 data 334 is also strongly correlated with the WW detection data 350 during the first time window. In contrast, a third portion of the correlation data 380 corresponds to a third correlation value (e.g., 0.0), indicating that the SSL3 data 336 is not at all correlated with the WW detection data 350 during the first time window. Similarly, a fourth portion of the correlation data 380 corresponds to a fourth correlation value (e.g., 0.33), indicating that the SSL4 data 338 is only weakly correlated with the WW detection data 350 during the first time window (e.g., correlated one third of the time).

While FIG. 3B illustrates that the first correlation value is equal to the second correlation value, the second correlation value includes an asterisk (*) to indicate that while the SSL2 data 334 is strongly correlated with the WW detection data 350 within the first time window, the SSL2 data 334 is not correlated with the WW detection data 350 outside of the first time window and/or based on a start time or an end time. Thus, while FIG. 3B illustrates an example in which the SSL2 data 334 is as strongly correlated as the SSL1 data 332 based on the simple illustration of comparing values within the first time window, the device 110 may be configured to calculate the correlation data 380 using additional information that would distinguish the SSL2 data 334 from the WW detection data 350 without departing from the disclosure.

To illustrate an example, the device 110 may determine a first timestamp corresponding to a beginning (e.g., start time) and a second timestamp corresponding to an ending (e.g., end time) of a first pulse represented in the WW detection data 350 during the first time window. Similarly, the device 110 may determine a third timestamp corresponding to a beginning and a fourth timestamp corresponding to an ending of a second pulse represented in the SSL1 data 332 during the first time window. Finally, the device 110 may determine a fifth timestamp corresponding to a beginning and a sixth timestamp corresponding to an ending of a third pulse represented in the SSL2 data 334 during the first time window.

In some examples, the device 110 may determine the first correlation value represented in the correlation data 380 in part by comparing the first timestamp to the third timestamp and/or comparing the second time stamp to the fourth timestamp. For example, the device 110 may identify that the first timestamp and the third timestamp are approximately equal and that the second timestamp and the fourth timestamp are approximately equal, which indicates that the second pulse represented in the SSL1 data 332 corresponds to the start time and end time of the first pulse represented in the WW detection data 350 (e.g., strong correlation).

Similarly, the device 110 may determine the second correlation value represented in the correlation data 380 in part by comparing the first timestamp to the fifth timestamp and/or comparing the second time stamp to the sixth timestamp. For example, the device 110 may identify that the fifth timestamp is different than the first timestamp and that the sixth timestamp is different than the fourth timestamp, which indicates that the third pulse represented in the SSL2 data 334 does not correspond to the first pulse represented in the WW detection data 350 (e.g., weak correlation). Thus, while the third pulse matches the first pulse during the first time window, the device 110 would determine the second correlation value to be lower than the first correlation value based on the start time and end time of the third pulse. In some examples, the second correlation value may depend on weight values associated with the first time window, the start time, and/or the end time. Thus, the device 110 may choose to weight each comparison differently without departing from the disclosure.

Based on the correlation data 380 and/or the additional information, the device 110 may determine that the SSL1 data 332 has a strongest correlation with the WW detection data 350 and may associate the wakeword with the SSL1 data 332 and/or the first sound source (e.g., SSL1 and/or the first user 5a). Thus, the device 110 may determine that the first sound source corresponds to a human and/or that the SSL1 data 332 indicates speech represented in the audio data (e.g., voice command or other utterance).

While not illustrated in FIG. 3B, in some examples the device 110 may generate the correlation data 380 in part based on the best beam data 340. To illustrate an example, the device 110 may compare a location of each of the portions of the SSL data 330 to a location associated with the best beam data 340. For example, if the best beam data 340 associates the best beam with a first direction (e.g., first value in degrees) relative to the device 110 at a first time, the device 110 may compare the first direction to a second direction (e.g., second value in degrees) associated with the first sound source (e.g., SSL1 data 332) at the first time. In some examples, the device 110 may determine an absolute value of the difference between the first value and the second value and divide the absolute value by 180 degrees, although the disclosure is not limited thereto. Similarly, the device 110 may compare the first direction to a third direction (e.g., third value in degrees) associated with the second sound source (e.g., SSL2 data 334) at the first time. Thus, the device 110 may determine a second absolute value of the difference between the first value and the third value and divide the second absolute value by 180 degrees, although the disclosure is not limited thereto.

Figure 4:
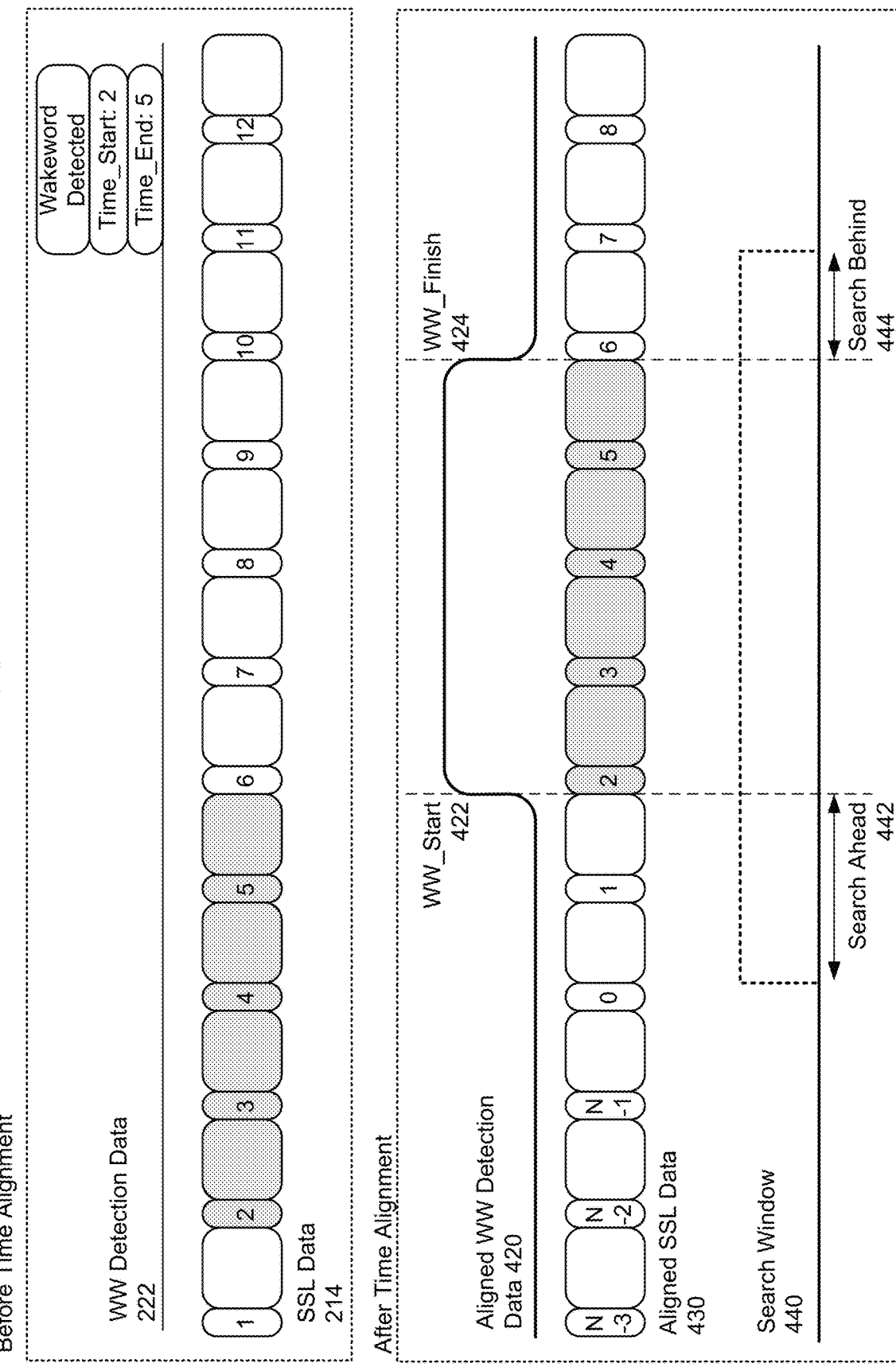
FIG. 4 illustrates an example of performing time alignment and estimating a size of a search window according to examples of the present disclosure.

FIG. 4 illustrates an example of performing time alignment and estimating a size of a search window according to examples of the present disclosure. As described above, the AFE component 210 may generate timestamp data corresponding to a series of timestamps using a global clock signal. The AFE component 210 may expose the timestamp data to the other components (e.g., the wakeword engine 220, the API component 230, and/or the motion center component 240) and the device 110 may synchronize the data generated by each of these components using the timestamp data.

FIG. 4 illustrates an example of performing time alignment. As illustrated in FIG. 4, before time alignment the device 110 may receive WW detection data 222 and SSL data 214. For example, FIG. 4 illustrates that the SSL data 214 corresponds to a first plurality of timestamps (e.g., timestamp "1" to timestamp "12"), while the WW detection data 222 indicates that a wakeword was detected between a start time (e.g., Time_Start: 2) and an end time (e.g., Time_End: 5). Due to propagation delays, processing delays, and/or the like, the motion center component 240 may not receive the WW detection data 222 until time has passed after the wakeword is detected. For example, FIG. 4 illustrates an example in which the WW detection data 222 indicates that the wakeword ended at a first time (e.g., timestamp "5") but the WW detection data 222 was not received by the motion center component 240 until a second time (e.g., timestamp "11"), although the disclosure is not limited thereto.

To perform time alignment, the motion center component 240 may include a buffer component configured to store SSL data for a defined period of time (e.g., 5 seconds). For example, the buffer component may store SSL data corresponding to multiple sound sources, which may be associated with unique tracking identification data. In some examples, the buffer component may be configured to store all of the SSL data for the defined period of time. However, the disclosure is not limited thereto, and in other examples the buffer component may only store a portion of the SSL data for the defined period of time. In response to receiving the WW detection data 222, the motion center component 240 may retrieve a portion of the SSL data stored in the buffer component, which is represented in FIG. 4 as the SSL data 214.

After receiving the WW detection data 222, the motion center 240 may generate aligned SSL data 430 corresponding to when the wakeword was detected. For example, the aligned SSL data 430 illustrated in FIG. 4 is represented by a second plurality of timestamps (e.g., timestamp "N-3" to timestamp "8") that is centered on the first time window during which the wakeword was detected.

In addition, the motion center 240 may use the WW detection data 222 to generate aligned WW detection data 420. As illustrated in FIG. 4, for example, the aligned WW detection data 420 may correspond to a pulse indicating that the wakeword was detected from the start time (e.g., Time_Start: 2), which is represented by WW_Start 422, to the end time (e.g., Time_End: 5), which is represented by WW_Finish 424. Thus, the aligned WW detection data 420 indicates the first time window within which the wakeword was detected, which corresponds to a portion of the aligned SSL data 430 (e.g., timestamp "2" through timestamp "5").

To account for propagation delays, processing delays, and/or the like, and to improve the correlation data generated by the motion center component 240, FIG. 4 illustrates that the device 110 may generate a search window 440 that is larger than the first time window associated with the wakeword being detected. For example, the device 110 may expand the search window 440 in a first direction (e.g., search ahead 442) to include a first portion of the aligned SSL data 430 (e.g., timestamp "0" and timestamp "1") and may expand the search window 440 in a second direction (e.g., search behind 444) to include a second portion of the aligned SSL data 430 (e.g., timestamp "6"), although the disclosure is not limited thereto. As described in greater detail below with regard to FIG. 5, the device 110 may determine the correlation data using the search window 440.

While FIG. 4 illustrates an example of the device 110 performing time alignment with the SSL data 214 to generate the aligned SSL data 430, the disclosure is not limited thereto. While not illustrated in FIG. 4, the device 110 may also perform time alignment with the best beam data 216 to generate aligned best beam data without departing from the disclosure. In some examples, the aligned SSL data 430 illustrated in FIG. 4 may correspond to a combination of the SSL data 214 and the best beam data 216 without departing from the disclosure.

Figure 5:
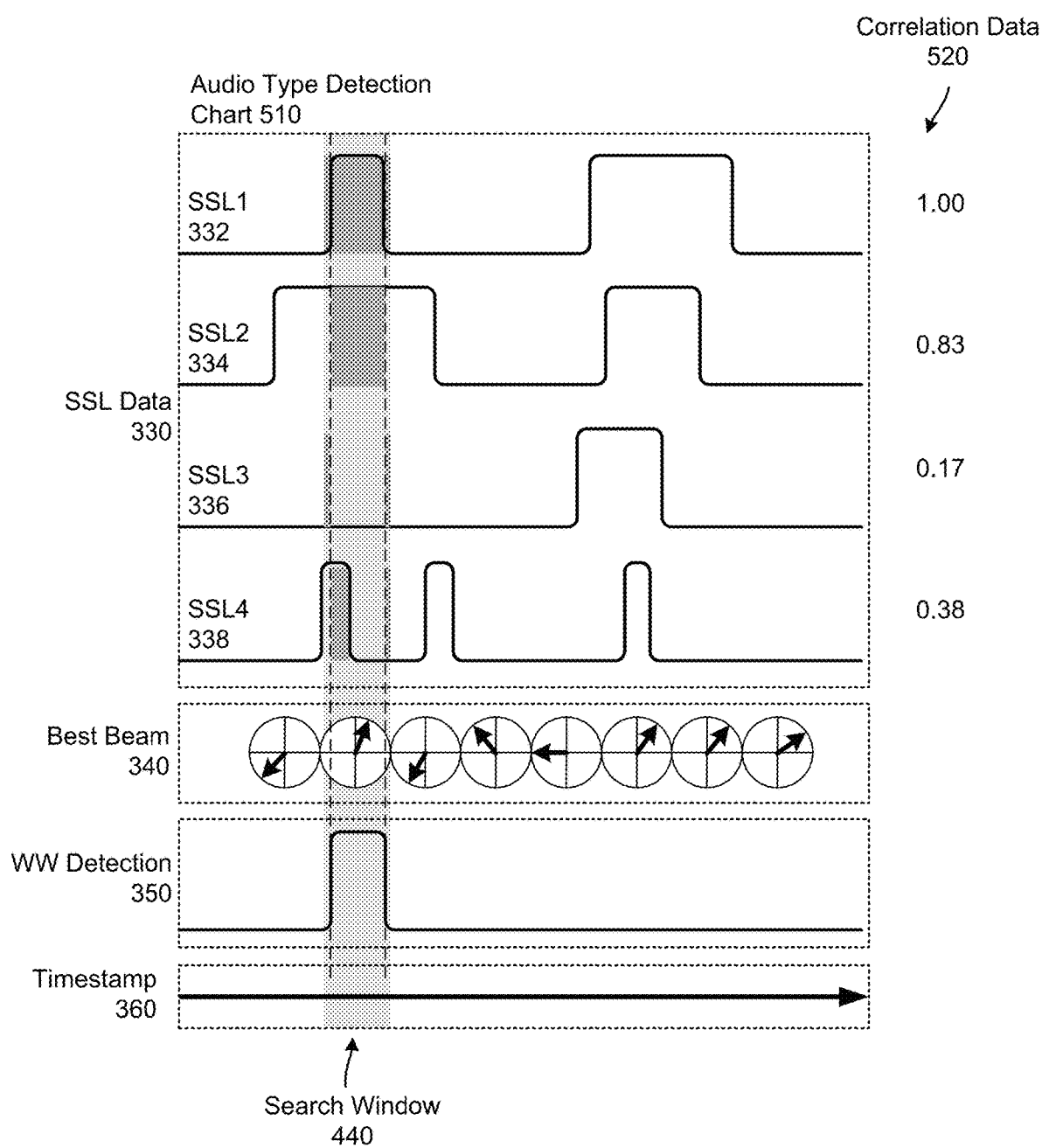
FIG. 5 illustrates an example of performing sound source localization audio type detection using a search window according to examples of the present disclosure.

FIG. 5 illustrates an example of performing sound source localization audio type detection using a search window according to examples of the present disclosure. For example, audio type detection chart 510 visually illustrates an example of how the device 110 may determine correlation data 520 using the search window 440 described above.

As illustrated in FIG. 5, the search window 440 is highlighted using shades of gray and extends before and after the pulse represented in the WW detection data 350. For each individual portion of the SSL data 330 and each timestamp within the search window 440, the device 110 may perform a mathematical operation to compare a first value of the portion of the SSL data 330 to a second value of the WW detection data 350 at the timestamp. For example, the device 110 may perform an "exclusive or" XOR (e.g., exclusive disjunction) operation between the first value of the SSL1 data 332 and the second value of the WW detection data 350, although the disclosure is not limited thereto and the device 110 may perform other operations without departing from the disclosure.

As illustrated in FIG. 5, the audio type detection chart 510 represents the first binary value (e.g., 0) generated by the XOR operation using a dark shade of gray and represents the second binary value (e.g., 1) generated by the XOR operation using a light shade of gray. For example, the SSL1 data 332 is equal to the WW detection data 350 for an entirety of the search window 440, resulting in the SSL1 data 332 being represented using the dark shade of gray throughout the search window 440. Unlike the example illustrated in FIG. 3B, however, FIG. 5 illustrates that the SSL2 data 334 does not correspond to the WW detection data 350 during the search window 440. Instead, the SSL2 data 334 is only equal to the WW detection data 350 during the first time window, resulting in the SSL2 data 334 being represented using the dark shade of gray within the first time window and the light shade of gray outside of the first time window.

While the SSL2 data 334 is equal to the second binary value throughout the search window 440, the SSL3 data 336 is equal to the first binary value throughout the search window 440, resulting in the correlation being completely opposite (e.g., complementary). For example, the SSL3 data 336 is different than the WW detection data 350 within the first time window but equal to the WW detection data 350 outside of the first time window, resulting in the SSL3 data 336 being represented using the light shade of gray within the first time window and the dark shade of gray outside of the first time window. Finally, the SSL4 data 338 does not correspond to the WW detection data 350 but is equal to the WW detection data 350 for multiple portions of the search window 440, resulting in the SSL4 data 338 being represented using alternating combinations of the dark shade of gray and the light shade of gray.

FIG. 5 illustrates a simple example of calculating the correlation data 520 based entirely on the XOR operation described above. As illustrated in FIG. 5, a first portion of the correlation data 520 corresponds to a first correlation value (e.g., 1.00), indicating that the SSL1 data 332 is perfectly correlated with the WW detection data 350 during the search window 440. In contrast, a second portion of the correlation data 520 corresponds to a second correlation value (e.g., 0.83), indicating that the SSL2 data 334 is strongly correlated with the WW detection data 350 during the search window 440. As described above, a third portion of the correlation data 520 corresponds to a third correlation value (e.g., 0.17) that is complementary to the second correlation value, indicating that the SSL3 data 336 is not correlated with the WW detection data 350 during the search window 440. Finally, a fourth portion of the correlation data 520 corresponds to a fourth correlation value (e.g., 0.38), indicating that the SSL4 data 338 is weakly correlated with the WW detection data 350 during the search window 440.

In contrast to the example illustrated in FIG. 3B, the audio type detection chart 510 illustrated in FIG. 5 determines the correlation data 520 using information outside of the first time window. As a result, the SSL2 data 334 went from being perfectly correlated with the WW detection data 350 within the first time window (e.g., 1.00) to being strongly correlated with the WW detection data 350 within the search window 440 (e.g., 0.83).

As described above with regard to FIG. 3B, however, in some examples the device 110 may calculate the correlation data 520 using additional information without departing from the disclosure. For example, the device 110 may determine the correlation data 520 based in part on a start time or an end time, as described above with regard to FIG. 3B. Additionally or alternatively, while not illustrated in FIG. 5, in some examples the device 110 may generate the correlation data 520 at least in part based on the best beam data 340, as described above with regard to FIG. 3B. Therefore, the device 110 may determine the correlation data 520 using weight values associated with the XOR operation, the start time, the end time, and/or the best beam correlation without departing from the disclosure. For example, the device 110 may choose to weight each comparison differently, although the disclosure is not limited thereto.

Based on the correlation data 520 and/or the additional information, the device 110 may determine that the SSL1 data 332 has a strongest correlation with the WW detection data 350 within the search window 440 and may associate the wakeword with the SSL1 data 332 and/or the first sound source (e.g., SSL1 and/or the first user 5a). Thus, the device 110 may determine that the first sound source corresponds to a human and/or that the SSL1 data 332 indicates speech represented in the audio data (e.g., voice command or other utterance), although the disclosure is not limited thereto.

Figure 6A:
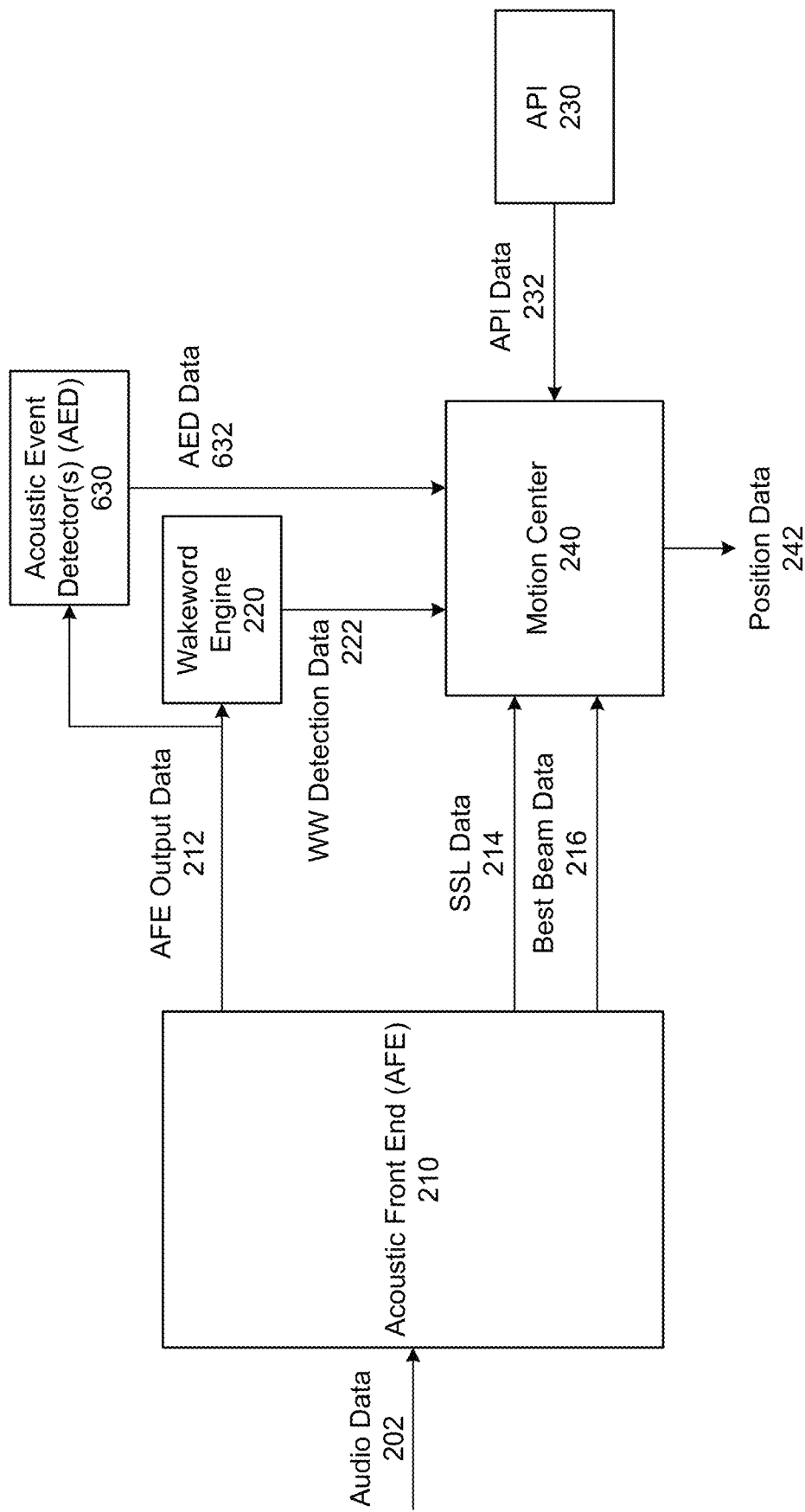

FIGS. 6A-6B illustrate example component diagrams of an audio type detection system using acoustic event detectors according to examples of the present disclosure. As illustrated in FIG. 6A, the device 110 may perform audio type detection 600 using one or more acoustic event detector(s) (AED) 630. As most of the components illustrated in FIG. 6A were described in detail above with regard to FIGS. 2A-2C, a redundant description is omitted.

In the example illustrated in FIG. 6A, the AFE component 210 may send the AFE output data 212 to the wakeword engine 220 and to the one or more AED(s) 630. However, the disclosure is not limited thereto, and in some examples the AFE component 210 may generate first AFE output data 212a for the wakeword engine 220 and may generate second AFE output data 212b for the one or more AED(s) 630 without departing from the disclosure. Additionally or alternatively, the AFE component 210 may generate unique AFE output data 212 for individual AEDs 630 without departing from the disclosure. Thus, in some examples the AFE component 210 may be configured to generate AFE output data 212 based on the AED 630, although the disclosure is not limited thereto.

An individual AED 630 may be configured to detect a particular acoustic event represented in the AFE output data 212. For example, the AED 630 may process the AFE output data 212 to perform acoustic event detection and generate AED data 632 indicating when the acoustic event is detected. To illustrate an example, a first AED 630a may be configured to detect speech and may generate first AED data 632a indicating when speech is represented in the audio data 202. In addition, a second AED 630b may be configured to detect sounds associated with pets (e.g., dogs barking, etc.) and may generate second AED data 632b indicating when pet sounds are represented in the audio data 202. The device 110 may include additional AEDs 630 without departing from the disclosure. However, the disclosure is not limited thereto and in some examples a single AED 630 may be configured to detect multiple acoustic events without departing from the disclosure.

The AED(s) 630 may send the AED data 632 to the motion center 240 and the motion center 240 may use the AED data 632 to identify additional audio types. For example, the motion center 240 may perform the steps described above, using the AED data 632 instead of the WW detection data 222, in order to associate a sound source represented in the SSL data 214 with an acoustic event and/or audio type. To illustrate an example, if the device 110 includes the first AED 630a configured to detect speech, the motion center 240 may associate the SSL2 data 334 and the SSL3 data 336 with human speech. Thus, the device 110 may determine that the second sound source and the third sound source correspond to the second user 5b and the third user 5c, despite the users not speaking the wakeword.

To illustrate another example, if the device 110 includes the second AED 630b configured to detect pet sounds, the motion center 240 may associate the SSL4 data 338 with the pet 10. Thus, the device 110 may determine that the fourth sound source corresponds to the pet 10, which the device 110 is unable to determine using the wakeword engine 220 alone.

While FIG. 6A illustrates an example in which the motion center 240 receives the WW detection data 222 from the wakeword engine 220 and the AED data 632 from one or more acoustic event detector(s) 630, the disclosure is not limited thereto. In some examples, for example, the motion center 240 may only receive the AED data 632 from the one or more acoustic event detector(s) 630 without departing from the disclosure. Thus, in some examples the motion center 240 may determine the position data 242 without receiving the WW detection data 222 from the wakeword engine 220 without departing from the disclosure.

In some examples, the device 110 may determine confidence score data corresponding to the SSL data 214 and/or the AED data 632. For example, FIG. 6B illustrates an example of the device 110 performing audio type detection 650 in which the AFE component 210 may generate AFE confidence data 218 corresponding to the SSL data 214 and/or the AED(s) 630 may generate AED confidence data 634 corresponding to the AED data 632. While FIG. 6B illustrates an example of the device 110 generating both the AFE confidence data 218 and the AED confidence data 634, the disclosure is not limited thereto and the device 110 may generate the AFE confidence data 218 or the AED confidence data 634 without departing from the disclosure. Additionally or alternatively, while FIG. 6B illustrates an example of the device 110 generating the AFE confidence data 218 and the AED confidence data 634 in addition to the best beam data 216 and/or the API data 232, the disclosure is not limited thereto and the device 110 may generate any combination of the best beam data 216, the AFE confidence data 218, the AED confidence data 634, and/or the API data 232 without departing from the disclosure.

As the AFE confidence data 218 is described above with regard to FIG. 2C, a corresponding description is omitted. Additionally or alternatively, while FIG. 6B does not illustrate the WW confidence data 224, the wakeword engine 220 may generate the WW confidence data 224 described above with regard to FIG. 2C and may send the WW confidence data 224 to the motion center 240 without departing from the disclosure.

In the audio type detection 650 example illustrated in FIG. 6B, the motion center 240 is configured to process the SSL data 214, the best beam data 216, the AFE confidence data 218, the WW detection data 222, the AED data 632, the AED confidence data 634, and/or the API data 232 to generate the position data 242 corresponding to the sound sources. Thus, the motion center 240 may be configured to track a sound source over time as described above with regard to FIG. 2A without departing from the disclosure. For example, the motion center 240 may enable the device 110 to track the sound source even as the device 110 and/or the sound source move relative to each other. In some examples, the position data 242 may include a unique identification indicating an individual sound source, along with information about a position of the sound source relative to the device 110, a location of the sound source using a coordinate system or the like, an audio type associated with the sound source, additional information about the sound source (e.g., user identification, type of sound source, etc.), and/or the like, although the disclosure is not limited thereto.

As discussed above with regard to FIG. 2A, the AFE component 210 may generate timestamp data corresponding to a series of timestamps using a global clock signal. Thus, the AFE component 210 may embed the timestamp data in the AFE output data 212, the SSL data 214, the best beam data 216, and/or the AFE confidence data 218 and/or the AFE component 210 may expose the timestamp data to the wakeword engine 220, the AED(s) 630, and/or the API component 230 to enable the device 110 to synchronize multiple components using the timestamp data. While the device 110 may align the timeline between each of the components (e.g., synchronize data generated by each of these components using the global clock signal), the components may exhibit different and/or varying propagation delays and other processing delays. As a result, the information represented in the AFE output data 212, the SSL data 214, the best beam data 216, the AFE confidence data 218, the WW detection data 222, the AED data 632, the AED confidence data 634, and/or the API data 232 may correspond to a single event but may be associated with different timestamps. For example, in response to a user saying the wakeword, the WW detection data 222 may indicate that a wakeword is represented during a first time range, while the SSL data 214 may indicate that an audible sound associated with a first sound source is detected during a second time range that is slightly different than the first time range. Therefore, the WW detection data 222 and/or the AED data 632 may not align perfectly with audible sounds represented in the SSL data 214, but the motion center 240 may determine similarities based on a correlation between them.

In some examples the motion center 240 may generate the position data 242 by calculating correlation data between each of the individual SSL tracks and the AED data 632. For example, the device 110 may calculate first correlation data that includes correlation values (e.g., ranging from 0.0 to 1.0) indicating a similarity between each of the individual SSL tracks and a first acoustic event represented in the AED data 632. The motion center 240 may then use the first correlation data to determine which of the individual SSL tracks corresponds to the first acoustic event. For example, if the first correlation data includes a first correlation value (e.g., 0.88) associated with a first sound source and a second correlation value (e.g., 0.33) associated with a second sound source, the motion center 240 may determine that the first correlation value is a highest correlation value included in the first correlation data and associate the first sound source with the first acoustic event.

In some examples, the motion center 240 may generate the position data 242 using the SSL data 214 and the AED confidence data 634. For example, if the AED confidence data 634 indicates a likelihood that an individual SSL track corresponds to a particular acoustic event (e.g., speech, pet noises, mechanical noises, etc.), the motion center 240 may generate the first correlation data described above and then generate second correlation data using a weighted sum of the first correlation data and the AED confidence data 634, although the disclosure is not limited thereto. For example, if the first correlation data includes a first correlation value (e.g., 0.88) associated with a first sound source and a second correlation value (e.g., 0.33) associated with a second sound source, and the AED confidence data 634 includes a first confidence value (e.g., 0.75) associated with the first sound source and a second confidence value (e.g., 0.25) associated with the second sound source, the motion center 240 may generate second correlation data including a first value (e.g., 0.88*0.75=0.66) corresponding to the first sound source and a second value (e.g., 0.33*0.25=0.0825) corresponding to the second sound source. Thus, the motion center 240 may determine that the first value is a highest value included in the second correlation data and associate the first sound source with the first acoustic event. However, this example is intended to conceptually illustrate a simple example and the disclosure is not limited thereto.

In other examples, the motion center 240 may include a machine learning model, such as a deep neural network (DNN) or the like, without departing from the disclosure. For example, the motion center 240 may be configured to process the SSL data 214, the best beam data 216, the AFE confidence data 218, the WW detection data 222, the WW confidence data 224, the AED data 632, the AED confidence data 634, the API data 232, and/or additional data using the machine learning model to generate the position data 242 corresponding to the sound sources.

To illustrate a simple example, the motion center 240 may generate the first correlation data using the SSL data 214 and the AED data 632, as described above, and may input the first correlation data and the AED confidence data 634 to the machine learning model. Instead of generating the weighted sum described above, however, the machine learning model may generate output confidence data including confidence scores for each of the individual SSL tracks. In this example, the motion center 240 may determine that a first output confidence value corresponding to the first sound source is a highest output confidence value of the output confidence data and associate the first sound source with the first acoustic event. The disclosure is not limited thereto, however, and in other examples the machine learning model may generate output data without the motion center 240 calculating the first correlation data without departing from the disclosure.

To illustrate another example, the motion center 240 may input the SSL data 214, the best beam data 216, the AFE confidence data 218, the WW detection data 222, the WW confidence data 224, the AED data 632, the AED confidence data 634, and/or the API data 232 to the machine learning model to generate the output data. The output data may correspond to correlation values (e.g., similarity between each of the SSL tracks and the AED data 632 during the acoustic event), confidence values (e.g., likelihood that each of the SSL tracks corresponds to the acoustic event), SSL type data (e.g., indicating a type of acoustic event associated with each of the SSL tracks), and/or the like without departing from the disclosure.

Figure 7A:
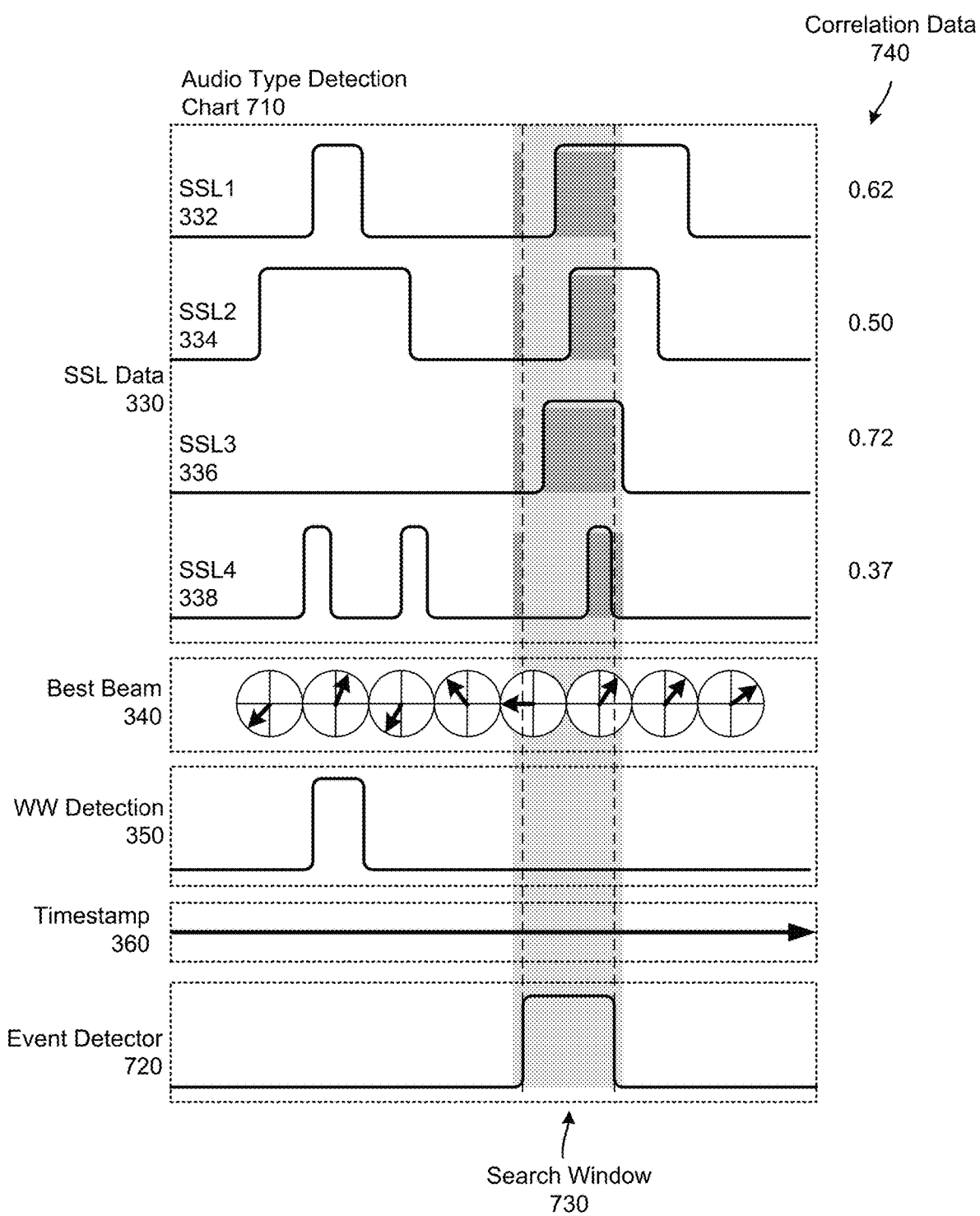
FIGS. 7A-7B illustrate examples of performing sound source localization audio type detection using acoustic event detectors according to examples of the present disclosure.
Figure 7B:
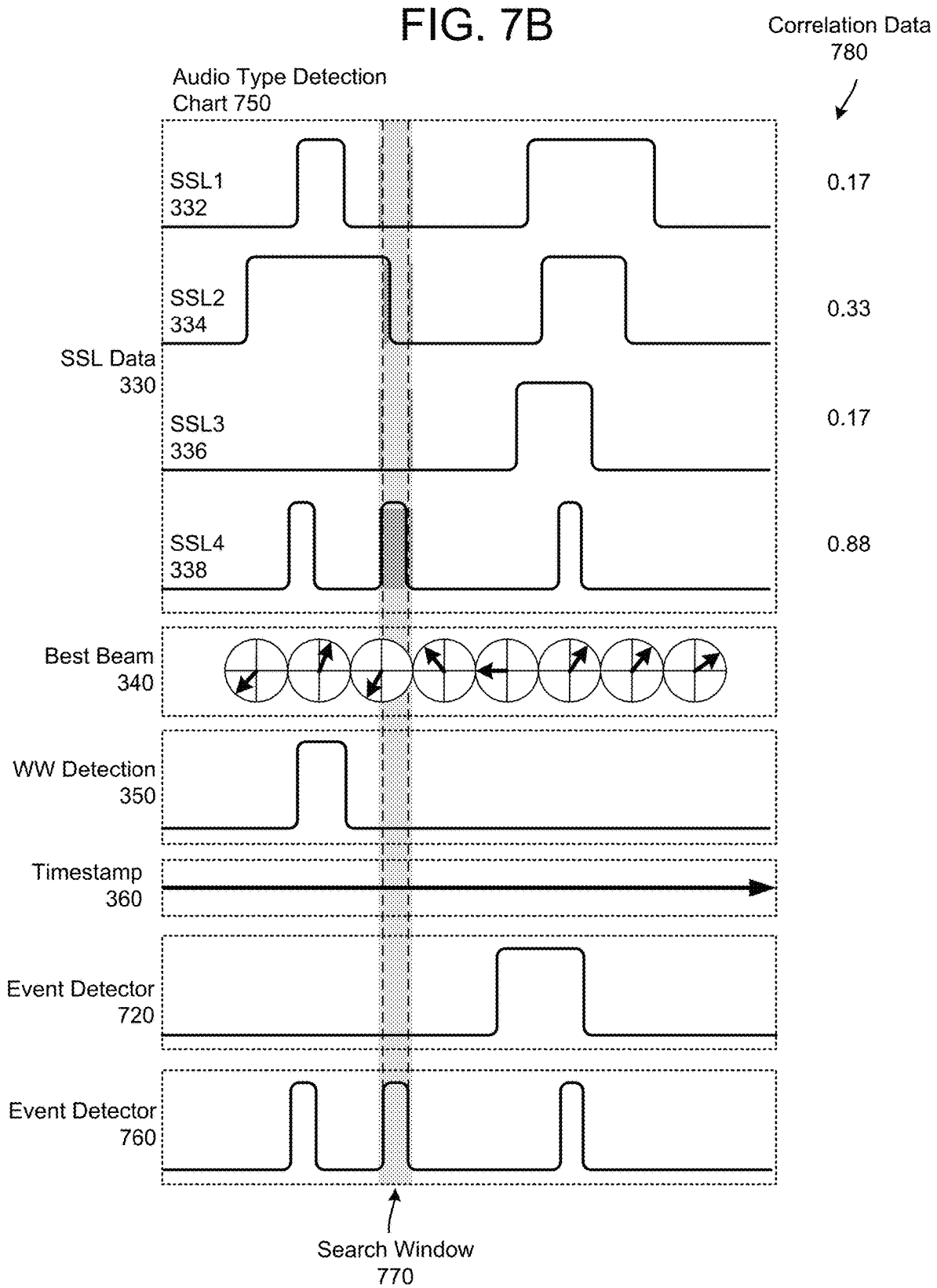

FIGS. 7A-7B illustrate examples of performing sound source localization audio type detection using acoustic event detectors according to examples of the present disclosure. For example, FIG. 7A illustrates a first audio type detection chart 710 that visually illustrates a first example of the device 110 determining a first correlation between the SSL data 330 and first event detector data 720 corresponding to a first acoustic event, whereas FIG. 7B illustrates a second audio type detection chart 750 that visually illustrates a second example of the device 110 determining a second correlation between the SSL data 330 and second event detector data 760 corresponding to a second acoustic event.

As illustrated in FIG. 7A, the device 110 may identify a first acoustic event represented in the first event detector data 720, determine a first time window corresponding to the first acoustic event, and determine a first search window 730 extending before and after the first time window. In the first audio type detection chart 710, the first search window 730 is highlighted using shades of gray and extends before and after the pulse represented in the first event detector data 720. For each individual portion of the SSL data 330 and each timestamp within the search window 730, the device 110 may perform a mathematical operation to compare a first value of the portion of the SSL data 330 to a second value of the first event detector data 720 at the timestamp. For example, the device 110 may perform an "exclusive or" XOR (e.g., exclusive disjunction) operation between the first value of the SSL1 data 332 and the second value of the first event detector data 720, although the disclosure is not limited thereto and the device 110 may perform other operations without departing from the disclosure.

As illustrated in FIG. 7A, the first audio type detection chart 710 represents the first binary value (e.g., 0) generated by the XOR operation using a dark shade of gray and represents the second binary value (e.g., 1) generated by the XOR operation using a light shade of gray. For example, the SSL1 data 332 includes a first portion having the first binary value (e.g., where both the SSL1 data 332 and the first event detector data 720 are equal to a value of zero), a second portion having the second binary value (e.g., the first event detector data 720 switches to a value of one), a third portion having the first binary value (e.g., the SSL1 data 332 and the first event detector data 720 both have a value of one), and a fourth portion having the second binary value (e.g., the first event detector data 720 switches back to a value of zero). Thus, the SSL1 data 332 is shaped similarly to the first event detector data 720, but lags the pulse represented in the first event detector data 720 by a sufficient amount.

Similarly, the SSL2 data 334 includes a first portion having the first binary value (e.g., where both the SSL2 data 334 and the first event detector data 720 are equal to a value of zero), a second portion having the second binary value (e.g., the first event detector data 720 switches to a value of one), a third portion having the first binary value (e.g., the SSL2 data 334 and the first event detector data 720 both have a value of one), a fourth portion having the second binary value (e.g., the first event detector data 720 switches back to a value of zero), and a very short fifth portion having the first binary value (e.g., the SSL2 data 334 and the first event detector data 720 both have a value of zero). Thus, the SSL2 data 334 is also shaped similarly to the first event detector data 720, but lags the pulse represented in the first event detector data 720 by an even larger amount.

In contrast, the SSL3 data 336 is extremely similar to the first event detector data 720. For example, the SSL3 data 336 includes a first portion having the first binary value (e.g., where both the SSL3 data 336 and the first event detector data 720 are equal to a value of zero), a second portion having the second binary value (e.g., the first event detector data 720 switches to a value of one), a third portion having the first binary value (e.g., the SSL3 data 336 and the first event detector data 720 both have a value of one), a very short fourth portion having the second binary value (e.g., the first event detector data 720 switches back to a value of zero), and a fifth portion having the first binary value (e.g., the SSL2 data 334 and the first event detector data 720 both have a value of zero). Thus, the SSL3 data 336 is shaped identically to the first event detector data 720, with a first pulse represented in the SSL3 data 336 equal in width to a second pulse represented in the first event detector data 720. However, FIG. 7A illustrates an example in which the first pulse is offset from the second pulse by a small amount, to conceptually illustrate that the device 110 may associate a sound source with an acoustic event even when there is not perfect correlation and/or overlap between the SSL data 330 and the first event detector data 720.

Finally, the SSL4 data 338 does not correspond to the first event detector data 720 but is equal to the first event detector data 720 for multiple portions of the search window 730, resulting in the SSL4 data 338 being represented using alternating combinations of the dark shade of gray and the light shade of gray.

FIG. 7A illustrates a simple example of calculating first correlation data 740 based entirely on the XOR operation described above. As illustrated in FIG. 7A, a first portion of the first correlation data 740 corresponds to a first correlation value (e.g., 0.62), indicating that the SSL1 data 332 is moderately correlated with the first event detector data 720 during the first search window 730. Similarly, a second portion of the first correlation data 740 corresponds to a second correlation value (e.g., 0.50), indicating that the SSL2 data 334 is moderately correlated with the first event detector data 720 during the first search window 730. A third portion of the first correlation data 740 corresponds to a third correlation value (e.g., 0.72), indicating that the SSL3 data 336 is strongly correlated with the first event detector data 720 during the first search window 730. Finally, a fourth portion of the first correlation data 740 corresponds to a fourth correlation value (e.g., 0.37), indicating that the SSL4 data 338 is weakly correlated with the first event detector data 720 during the first search window 730.

As described above with regard to FIG. 3B, however, in some examples the device 110 may calculate the first correlation data 740 using additional information without departing from the disclosure. For example, the device 110 may determine the first correlation data 740 based in part on a start time or an end time, as described above with regard to FIG. 3B. Additionally or alternatively, in some examples the device 110 may generate the first correlation data 740 at least in part based on the best beam data 340, as described above with regard to FIG. 3B. Therefore, the device 110 may determine the first correlation data 740 using weight values associated with the XOR operation, the start time, the end time, and/or the best beam correlation without departing from the disclosure. For example, the device 110 may choose to weight each comparison differently, although the disclosure is not limited thereto.

Based on the first correlation data 740, the device 110 may determine that the SSL3 data 336 has a strongest correlation with the first event detector data 720 within the first search window 730 and may associate the first acoustic event with the SSL3 data 336 and/or the third sound source (e.g., SSL3 and/or the third user 5c). The device 110 may interpret this association differently depending on the type of acoustic event that the AED 630 is configured to detect. For example, if the AED 630 is configured to detect speech, the device 110 may determine that the third sound source corresponds to a human and/or that the SSL3 data 336 indicates speech represented in the audio data, although the disclosure is not limited thereto.

The example illustrated in FIG. 7A is intended to conceptually illustrate a simple example. In practice, if the AED 630 is configured to detect speech, the first event detector data 720 may correspond to the SSL1 data 332, the SSL2 data 334, and/or the SSL3 data 336 without departing from the disclosure. For example, the first event detector data 720 may include additional pulses corresponding to the speech generated by the users 5a/5b/5c. However, the disclosure is not limited thereto and the AED 630 may be configured to detect speech associated with the third user 5c in particular (e.g., speaker recognition, voice recognition, etc.) without departing from the disclosure.

While FIG. 1 illustrates that the third sound source corresponds to the third user 5c, the disclosure is not limited thereto. In some examples, the AED 630 may be configured to detect mechanical sounds and the device 110 may determine that the third sound source corresponds to an appliance or other object associated with the mechanical sounds, although the disclosure is not limited thereto.

As illustrated in FIG. 7B, the device 110 may identify a second acoustic event represented in the second event detector data 760, determine a second time window corresponding to the second acoustic event, and determine a second search window 770 extending before and after the second time window. In the second audio type detection chart 750, the second search window 770 is highlighted using shades of gray and extends before and after the pulse represented in the second event detector data 760. For each individual portion of the SSL data 330 and each timestamp within the second search window 770, the device 110 may perform a mathematical operation to compare a first value of the portion of the SSL data 330 to a second value of the second event detector data 760 at the timestamp. For example, the device 110 may perform an "exclusive or" XOR (e.g., exclusive disjunction) operation between the first value of the SSL1 data 332 and the second value of the second event detector data 760, although the disclosure is not limited thereto and the device 110 may perform other operations without departing from the disclosure.

As illustrated in FIG. 7B, the second audio type detection chart 760 represents the first binary value (e.g., 0) generated by the XOR operation using a dark shade of gray and represents the second binary value (e.g., 1) generated by the XOR operation using a light shade of gray. For example, the SSL1 data 332 includes a first portion having the first binary value (e.g., where both the SSL1 data 332 and the first event detector data 720 are equal to a value of zero), a second portion having the second binary value (e.g., the second event detector data 760 switches to a value of one), and a third portion having the first binary value (e.g., the SSL1 data 332 and the second event detector data 760 both have a value of zero). Thus, the SSL1 data 332 does not include a pulse within the second search window 770 and is only moderately correlated with the second event detector data 760 due to the short pulse represented in the second event detector data 760. The SSL3 data 336 is identical to the SSL1 data 332 and does not include a pulse within the second search window 770 (e.g., has a value of zero during the second search window 770), so a redundant description is omitted.

The SSL2 data 334 includes a first portion having the second binary value (e.g., where the SSL2 data 334 has a value of one while the second event detector data 760 has a value of zero), a second portion having the first binary value (e.g., where both the SSL2 data 334 and the second event detector data 760 are equal to a value of one), a third portion having the second binary value (e.g., the SSL2 data 334 switches to a value of zero), and a fourth portion having the first binary value (e.g., the SSL2 data 334 and the second event detector data 760 both have a value of zero). Thus, the SSL2 data 334 is weakly correlated to the second event detector data 760.

In contrast, the SSL4 data 338 is extremely similar to the second event detector data 760. For example, the SSL4 data 338 includes a first portion having the first binary value (e.g., where both the SSL4 data 338 and the second event detector data 760 are equal to a value of zero), a second portion having the first binary value (e.g., where both the SSL4 data 338 and the second event detector data 760 are equal to a value of one), and a third portion having the first binary value (e.g., where both the SSL4 data 338 and the second event detector data 760 are equal to a value of zero). Thus, the SSL4 data 338 is shaped identically to the second event detector data 760, with a first pulse represented in the SSL4 data 338 that is identical to a second pulse represented in the second event detector data 760.

FIG. 7B illustrates a simple example of calculating second correlation data 780 based entirely on the XOR operation described above. As illustrated in FIG. 7B, a first portion of the second correlation data 780 corresponds to a first correlation value (e.g., 0.17), indicating that the SSL1 data 332 is not correlated with the second event detector data 780 during the second search window 770. A second portion of the second correlation data 780 corresponds to a second correlation value (e.g., 0.33), indicating that the SSL2 data 334 is weakly correlated with the second event detector data 760 during the second search window 770. A third portion of the second correlation data 780 corresponds to a third correlation value (e.g., 0.17), indicating that the SSL3 data 336 is not correlated with the second event detector data 760 during the second search window 770. Finally, a fourth portion of the second correlation data 780 corresponds to a fourth correlation value (e.g., 0.88), indicating that the SSL4 data 338 is strongly correlated with the second event detector data 780 during the second search window 770.

As described above with regard to FIG. 3B, however, in some examples the device 110 may calculate the second correlation data 780 using additional information without departing from the disclosure. For example, the device 110 may determine the second correlation data 780 based in part on a start time or an end time, as described above with regard to FIG. 3B. Additionally or alternatively, in some examples the device 110 may generate the second correlation data 780 at least in part based on the best beam data 340, as described above with regard to FIG. 3B. Therefore, the device 110 may determine the second correlation data 780 using weight values associated with the XOR operation, the start time, the end time, and/or the best beam correlation without departing from the disclosure. For example, the device 110 may choose to weight each comparison differently, although the disclosure is not limited thereto.

Based on the second correlation data 780, the device 110 may determine that the SSL4 data 338 has a strongest correlation with the second event detector data 760 within the second search window 770 and may associate the second acoustic event with the SSL4 data 338 and/or the fourth sound source (e.g., SSL4 and/or the pet 10). The device 110 may interpret this association differently depending on the type of acoustic event that the AED 630 is configured to detect. For example, if the AED 630 is configured to detect pet sounds, the device 110 may determine that the fourth sound source corresponds to an animal/pet and/or that the SSL4 data 338 indicates animal sounds represented in the audio data, although the disclosure is not limited thereto.

While FIG. 1 illustrates that the fourth sound source corresponds to the pet 10, the disclosure is not limited thereto. In some examples, the AED 630 may be configured to detect mechanical sounds and the device 110 may determine that the fourth sound source corresponds to an appliance or other object associated with the mechanical sounds, although the disclosure is not limited thereto.

Figure 8:
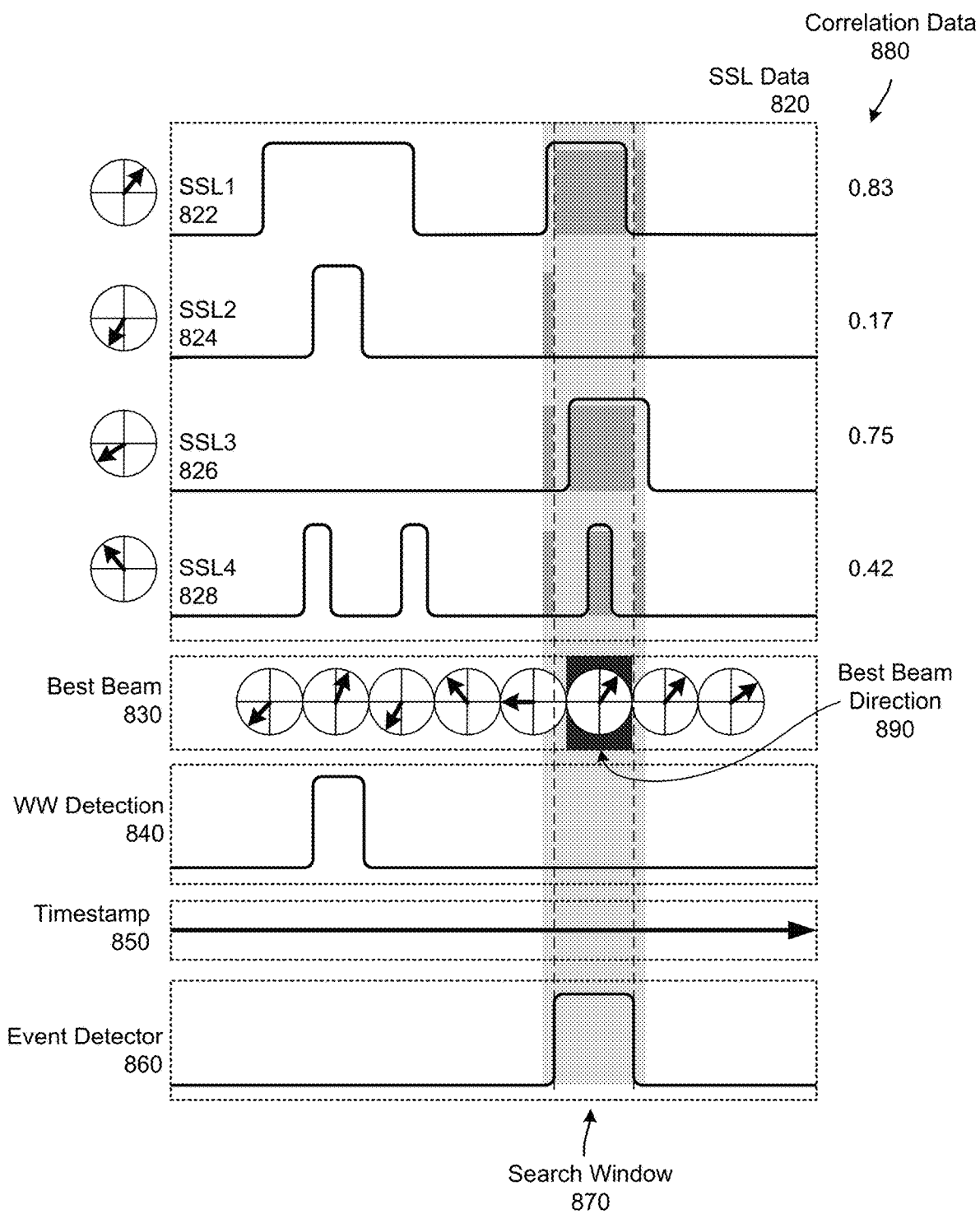
FIG. 8 illustrates an example of performing sound source localization audio type detection using best beam data according to examples of the present disclosure.

FIG. 8 illustrates an example of performing sound source localization audio type detection using best beam data according to examples of the present disclosure. For example, FIG. 8 illustrates a best beam tiebreaker example 800 in which the best beam data 216 is used to choose between two sound sources that have similar correlation values. While the SSL data 214 may include separate SSL data for each individual sound source represented in the audio data 202, the best beam data 216 only corresponds to a single "beam" at a time, indicating a direction that corresponds to a strongest signal for a particular time range. For example, the AFE component 210 may generate the best beam data 216 by identifying a strongest signal quality metric (e.g., signal-to-noise ratio (SNR) value, energy value, etc.) of sound sources represented in the audio data 202 and determining a direction associated with the strongest signal quality metric.

While the AFE component 210 only selects a single beam at a time, the best beam selected by the AFE component 210 may vary over time without departing from the disclosure, indicating which sound source is strongest at a given time. Thus, when the motion center 240 determines that two separate sound sources are strongly correlated with an acoustic event (e.g., wakeword event, speech, pet noises, mechanical noises, etc.), the motion center 240 may use the best beam data 216 as a tiebreaker to select between the two sound sources.

As illustrated in the best beam tiebreaker example 800 represented in FIG. 8, the motion center 240 may receive SSL data 820, best beam data 830, wakeword (WW) detection data 840, and event detector data 860, all synchronized based on timestamp data 850 generated by the AFE component 210. In this example, the motion center 240 may identify an acoustic event represented in the event detector data 860 and may attempt to identify a sound source to which to associate the acoustic event. For example, the motion center 240 may determine a first time window corresponding to the acoustic event, determine a search window 870 extending before and after the first time window, and may calculate correlation data 880 using the search window 870.

As illustrated in FIG. 8, the search window 870 is highlighted using shades of gray and extends before and after the pulse represented in the event detector data 860. For each individual portion of the SSL data 820 and each timestamp within the search window 860, the device 110 may perform a mathematical operation to compare a first value of the portion of the SSL data 820 to a second value of the event detector data 860 at the timestamp. For example, the device 110 may perform an "exclusive or" XOR (e.g., exclusive disjunction) operation between the first value of the SSL1 data 822 and the second value of the event detector data 860, although the disclosure is not limited thereto and the device 110 may perform other operations without departing from the disclosure.

As illustrated in FIG. 8, the best beam tiebreaker example 800 represents a first binary value (e.g., 0) generated by the XOR operation using a dark shade of gray and represents a second binary value (e.g., 1) generated by the XOR operation using a light shade of gray. For example, the SSL1 data 822 includes a first portion having the second binary value (e.g., the SSL1 data 822 is high while the event detector data 860 is low), a second portion having the first binary value (e.g., where both the SSL1 data 822 and the event detector data 860 are equal to a value of one), a third portion having the second binary value (e.g., the SSL1 data 822 switches to a value of zero), and a fourth portion having the first binary value (e.g., the SSL1 data 822 and the event detector data 860 both have a value of zero). Thus, the SSL1 data 822 is shaped similarly to the event detector data 860, but precedes the pulse represented in the event detector data 860 slightly.

In contrast, the SSL2 data 824 has a value of zero during an entirety of the search window 870. Thus, the SSL2 data 824 includes a first portion and a third portion having the first binary value (e.g., where both the SSL2 data 824 and the event detector data 860 are equal to a value of zero) with a second portion having the second binary value (e.g., the event detector data 860 switches to a value of one).

Similar to the SSL1 data 822, the SSL3 data 826 is extremely similar to the event detector data 860. For example, the SSL3 data 826 includes a first portion having the first binary value (e.g., where both the SSL3 data 826 and the event detector data 860 are equal to a value of zero), a second portion having the second binary value (e.g., the event detector data 860 switches to a value of one), a third portion having the first binary value (e.g., the SSL3 data 826 and the event detector data 860 both have a value of one), and a fourth portion having the second binary value (e.g., the event detector data 860 switches to a value of zero). Thus, the SSL3 data 826 is shaped similarly to the event detector data 860, but lags the pulse represented in the event detector data 860 slightly.

Finally, the SSL4 data 828 does not correspond to the event detector data 860 but is equal to the event detector data 860 for multiple portions of the search window 730, resulting in the SSL4 data 828 being represented using alternating combinations of the dark shade of gray and the light shade of gray.

FIG. 8 illustrates a simple example of calculating correlation data 880 based entirely on the XOR operation described above. As illustrated in FIG. 8, a first portion of the correlation data 880 corresponds to a first correlation value (e.g., 0.83), indicating that the SSL1 data 822 is strongly correlated with the event detector data 860 during the first search window 870. Similarly, a second portion of the correlation data 880 corresponds to a second correlation value (e.g., 0.17), indicating that the SSL2 data 824 is not correlated with the event detector data 860 during the search window 870. A third portion of the correlation data 880 corresponds to a third correlation value (e.g., 0.75), indicating that the SSL3 data 826 is strongly correlated with the event detector data 860 during the search window 870. Finally, a fourth portion of the correlation data 880 corresponds to a fourth correlation value (e.g., 0.42), indicating that the SSL4 data 828 is weakly correlated with the event detector data 860 during the search window 770.

Based on the correlation data 880, the device 110 may determine that the SSL1 data 822 and the SSL3 data 826 are strongly correlated with the event detector data 860 within the search window 870. For example, the device 110 may determine that both the first correlation value (e.g., 0.83) and the third correlation value (e.g., 0.75) exceed a threshold value (e.g., 0.50, although the disclosure is not limited thereto). However, despite the first correlation value exceeding the third correlation value, the device 110 may not simply select the highest correlation value as both sound sources are strongly correlated with the event detector data 860. Instead, the device 110 may apply additional tiebreakers to choose between the SSL1 data 822 and the SSL3 data 826.

In some examples, the device 110 may compare a start time, an end time, a width, and/or other information associated with the pulses represented in the SSL1 data 822, the SSL3 data 826, and the event detector data 860 during the search window 870. For example, the device 110 may place additional weight on a first pulse represented in the SSL data 820 that starts and/or ends at the same time as a second pulse represented in the event detector data 860. Additionally or alternatively, the device 110 may place additional weight on the first pulse represented in the SSL data 820 if a first width of the first pulse corresponds to a second width of the second pulse (e.g., selecting the first pulse over a third pulse represented in the SSL data 820 that has a significantly longer width than the second pulse). While not illustrated in FIG. 8, the device 110 may use the start time, the end time, the width, and/or the other information to generate the correlation data 880.

In the best beam tiebreaker example 800 illustrated in FIG. 8, the SSL1 data 822 and the SSL3 data 826 have a similar pulse width and pulse shape as the acoustic event represented in the event detector data 860, but neither the SSL1 data 822 or the SSL3 data 826 share the start time or the end time with the pulse represented in the event detector data 860. Thus, the device 110 may be unable to use this information as tiebreakers to select between the SSL1 data 822 and the SSL3 data 826.

Instead, FIG. 8 illustrates an example in which the device 110 may use the best beam data 830 as a tiebreaker to select between the SSL1 data 822 and the SSL3 data 826. For example, the device 110 may use the best beam data 830 to determine a best beam direction 890 corresponding to the search window 870. The device 110 may compare the best beam direction 890 to a first direction associated with the first sound source (e.g., SSL1 data 822) and a second direction associated with the third sound source (e.g., SSL3 data 826). As the best beam direction 890 is much closer to the first direction than the second direction, the device 110 may associate the acoustic event represented in the event detector data 860 with the SSL1 data 822 and/or the first sound source (e.g., SSL1 and/or the first user 5*a*).

In some examples, the best beam direction 890 and the directions associated with each of the sound sources may be represented as a value in degrees (e.g., between 0-360 degrees) relative to a position of the device 110. For example, the device 110 may determine a correlation between a sound source location and the best beam direction 890 using the following equation:

$$BestBeamCorrelation = \left| \frac{BestBeam - SSL}{180} \right| \quad [1]$$

where BestBeam represents the best beam direction 890, SSL represents the sound source location, and BestBeamCorrelation represents a similarity between the best beam direction 890 and the sound source location.

While FIG. 8 illustrates an example using the event detector data 860 (e.g., AED data 632), the disclosure is not limited thereto and the device 110 may use the best beam data 830 (e.g., best beam data 216) as a tiebreaker for the WW detection data 840 (e.g., WW detection data 222) without departing from the disclosure.

Figure 9:
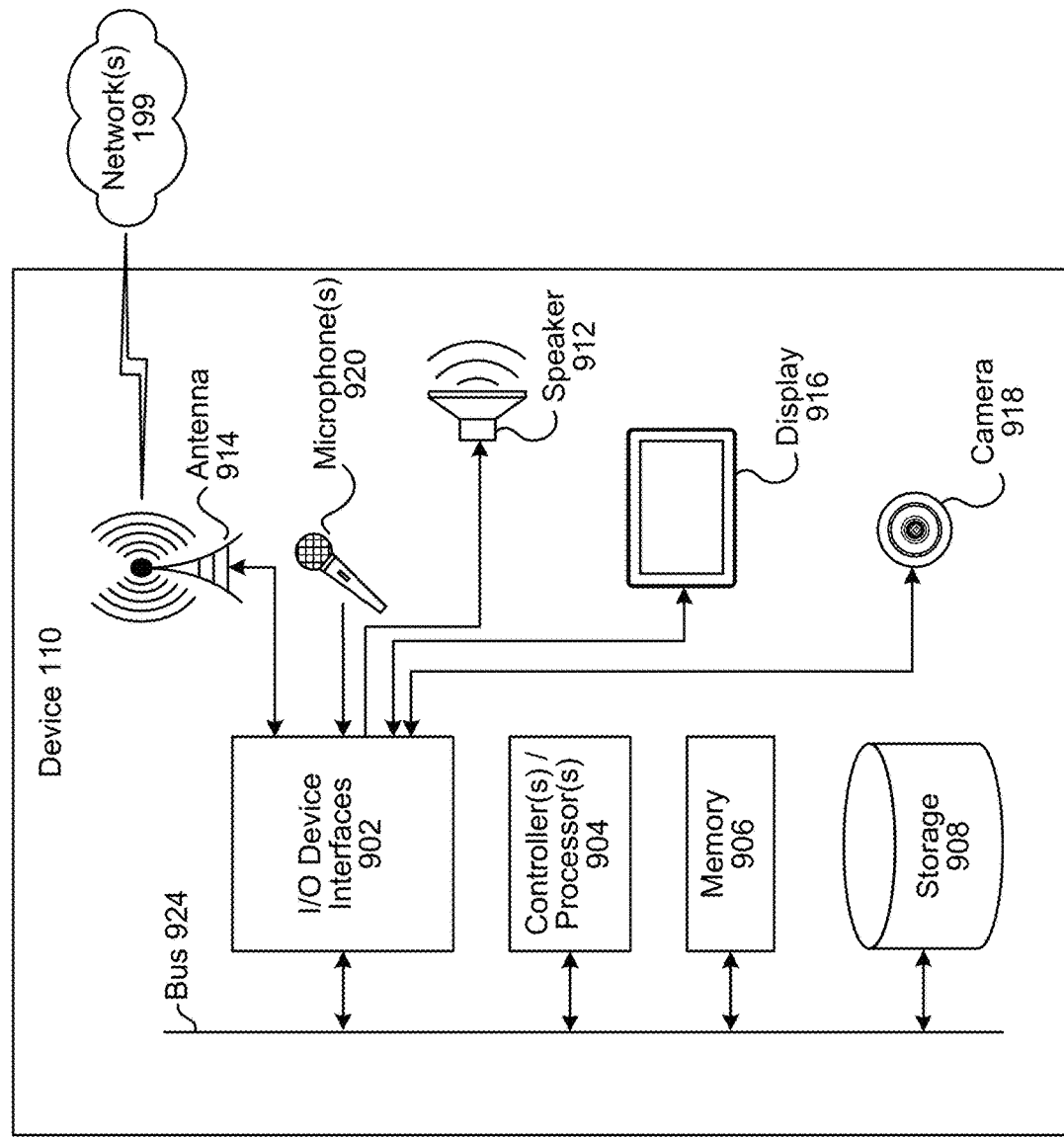
FIG. 9 is a block diagram conceptually illustrating example components of a device according to embodiments of the present disclosure.
Figure 10:
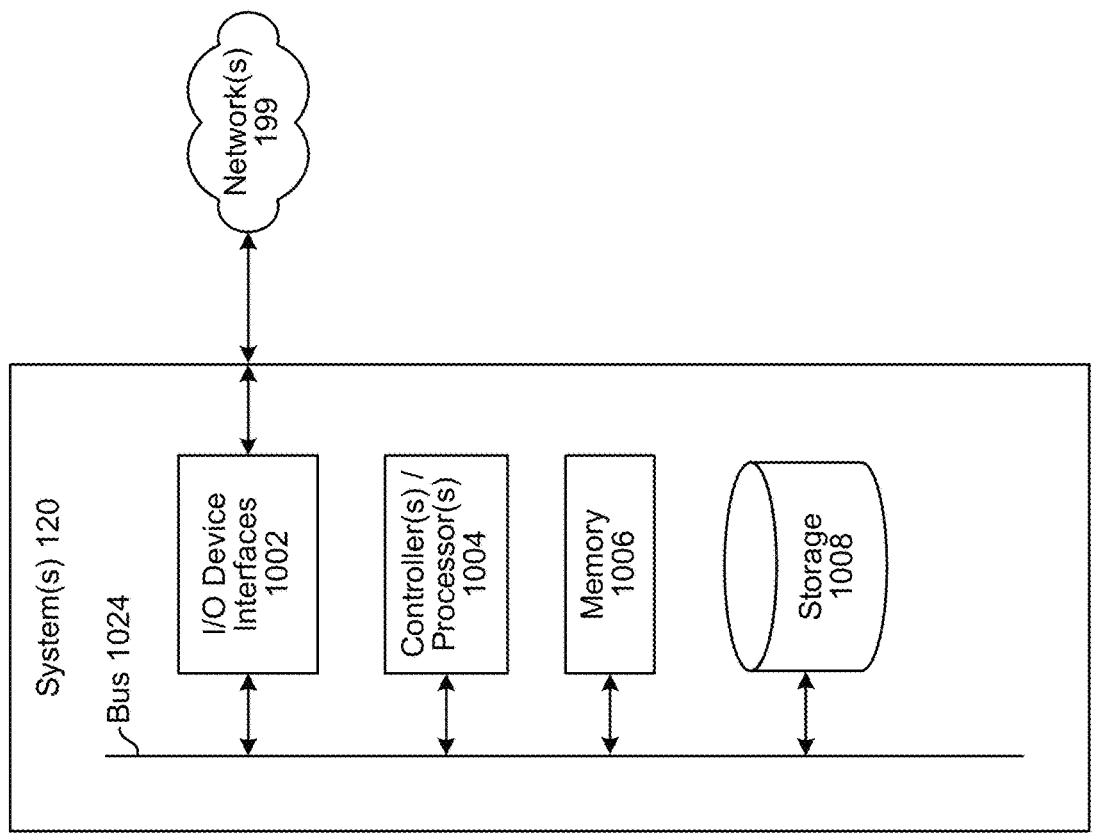
FIG. 10 is a block diagram conceptually illustrating example components of a remote system according to embodiments of the present disclosure.

FIG. 9 is a block diagram conceptually illustrating a device 110 that may be used with the system. FIG. 10 is a block diagram conceptually illustrating example components of a remote system 120, such as a natural language processing system(s), which may assist with natural language processing such as automatic speech recognition (ASR) processing, natural language understanding (NLU) processing, and/or the like. Multiple remote systems 120 may be included in the overall system 100 of the present disclosure, such as one or more natural language processing systems for performing ASR processing, one or more natural language processing systems for performing NLU processing, etc. In operation, each of these systems may include computer-readable and computer-executable instructions that reside on the respective system 120, as will be discussed further below.

A remote system 120 may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The remote system(s) 120 may be configured to operate using one or more of a client-server model, a computer bureau model, grid computing techniques, fog computing techniques, mainframe techniques, utility computing techniques, a peer-to-peer model, sandbox techniques, or other computing techniques.

Each device 110 and/or system 120 may include one or more controllers/processors (904/1004), which may each include a central processing unit (CPU) for processing data and computer-readable instructions, and a memory (906/1006) for storing data and instructions of the respective device. The memories (906/1006) may individually include volatile random access memory (RAM), non-volatile read only memory (ROM), non-volatile magnetoresistive memory (MRAM), and/or other types of memory. Each device 110 and/or system 120 may also include a data storage component (908/1008) for storing data and controller/processor-executable instructions. Each data storage component (908/1008) may individually include one or more non-volatile storage types such as magnetic storage, optical storage, solid-state storage, etc. Each device 110 and/or system 120 may also be connected to removable or external non-volatile memory and/or storage (such as a removable memory card, memory key drive, networked storage, etc.) through respective input/output device interfaces (902/1002).

Computer instructions for operating each device 110 and/or system 120 and its various components may be executed by the respective device's controller(s)/processor(s) (904/1004), using the memory (906/1006) as temporary "working" storage at runtime. A device's computer instructions may be stored in a non-transitory manner in non-volatile memory (906/1006), storage (908/1008), or an external device(s). Alternatively, some or all of the executable instructions may be embedded in hardware or firmware on the respective device in addition to or instead of software.

Each device 110 and/or system 120 includes input/output device interfaces (902/1002). A variety of components may be connected through the input/output device interfaces (902/1002), as will be discussed further below. Additionally, each device 110 and/or system 120 may include an address/data bus (924/1024) for conveying data among components of the respective device. Each component within a device 110 and/or system 120 may also be directly connected to other components in addition to (or instead of) being connected to other components across the bus (924/1024).

Referring to FIG. 9, the device 110 may include input/output device interfaces 902 that connect to a variety of components such as an audio output component such as a speaker 912, a wired headset or a wireless headset (not illustrated), or other component capable of outputting audio. The device 110 may also include an audio capture component. The audio capture component may be, for example, a microphone 920 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 916 for displaying content and/or a camera 818 to capture image data, although the disclosure is not limited thereto.

Via antenna(s) 914, the input/output device interfaces 902 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (902/1002) may also include communication components that allow data to be exchanged between devices such as different physical servers in a collection of servers or other components.

The components of the device(s) 110 and the system(s) 120 may include their own dedicated processors, memory, and/or storage. Alternatively, one or more of the components of the device(s) 110 and/or the system(s) 120 may utilize the I/O interfaces (902/1002), processor(s) (904/1004), memory (906/1006), and/or storage (908/1008) of the device(s) 110 and system(s) 120, respectively. Thus, an ASR component may have its own I/O interface(s), processor(s), memory, and/or storage; an NLU component may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device(s) 110 and the system(s) 120, as described herein, are illustrative, and may be located as a stand-alone device or may be included, in whole or in part, as a component of a larger device or system.

As illustrated in FIG. 11, multiple devices (110a-110h, 120) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a speech-detection device 110b, refrigerator 110c, display device 110d, a smart television 110e, a display device 110f, a headless device 110g (e.g., configured to connect to a television), and/or a device 110h, may be connected to the network(s) 199 through a wireless service provider (e.g., using a WiFi or cellular network connection), over a wireless local area network (WLAN) (e.g., using WiFi or the like), over a wired connection such as a local area network (LAN), and/or the like. Other devices are included as network-connected support devices, such as the system(s) 120 and/or other devices (not illustrated). The support devices may connect to the network(s) 199 through a wired connection or wireless connection. The devices 110 may capture audio using one-or-more built-in or connected microphones or other audio capture devices, with processing performed by ASR components, NLU components, or other components of the same device or another device connected via the network(s) 199, such as an ASR component, NLU component 260, etc. of the remote system 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method for audio type detection, comprising:
   receiving first audio data from a first microphone and second audio data from a second microphone;
   determining first sound source localization data indicating that a first sound source is represented in a first portion of the first audio data, wherein the first sound source localization data is associated with a first time window and indicates a first direction;
   determining second sound source localization data indicating that a second sound source is represented in a second portion of the first audio data, wherein the second sound source localization data is associated with the first time window and indicates a second direction that is different from the first direction;
   determining, by a wakeword detector, wakeword data indicating that a wakeword is represented in the first audio data during a first portion of the first time window having a first length of time;
   determining a second time window including the first portion of the first time window, the second time window having a second length of time that is greater than the first length of time;
   determining a first correlation value between the wakeword data and the first sound source localization data within the second time window;
   determining a second correlation value between the wakeword data and the second sound source localization data within the second time window;
   determining that the first correlation value is greater than the second correlation value;
   based at least in part on determining that the first correlation value is greater than the second correlation value, associating the wakeword with the first sound source;
   generating third audio data that corresponds to a third portion of the first audio data; and
   causing language processing to be performed on the third audio data.

2. The computer-implemented method of claim 1, wherein determining the first correlation value further comprises:
   determining a first pulse represented in the first sound source localization data during the second time window;
   determining first timestamp data corresponding to a beginning of the first pulse;
   determining second timestamp data corresponding to an ending of the first pulse;
   determining a second pulse represented in the wakeword data during the second time window;
   determining third timestamp data corresponding to a beginning of the second pulse;
   determining fourth timestamp data corresponding to an ending of the second pulse;
   determining that the first sound source localization data is equal to the wakeword data during a first portion of the second time window;
   determining that the first sound source localization data is different than the wakeword data during a second portion of the second time window;
   determining, based on the first portion of the second time window, a third correlation value indicating a similarity between the first sound source localization data and the wakeword data during the second time window; and
   determining the first correlation value using the third correlation value, the first timestamp data, the second timestamp data, the third timestamp data, and the fourth timestamp data.

3. The computer-implemented method of claim 1, further comprising:
   determining, by an acoustic event detector, event data indicating that an acoustic event is represented in the first audio data during a second portion of the first time window having a third length of time;
   determining a third time window including the second portion of the first time window, the third time window having a fourth length of time that is greater than the third length of time;

determining a third correlation value between the event data and the first sound source localization data within the third time window;
determining a fourth correlation value between the event data and the second sound source localization data within the third time window;
determining that the fourth correlation value is greater than the third correlation value; and
associating the acoustic event with the second sound source.

4. A computer-implemented method, the method comprising:
receiving first data;
determining that a first portion of the first data represents a first audio source, wherein the first portion of the first data is associated with a first time window and indicates a first direction;
determining that a second portion of the first data represents a second audio source, wherein the second portion of the first data is associated with the first time window and indicates a second direction that is different from the first direction;
receiving second data;
determining, using the second data, occurrence of a first event during a portion of the first time window;
determining first correlation data indicating a first correlation between the second data and the first portion of the first data;
determining second correlation data indicating a second correlation between the second data and the second portion of the first data;
determining that the first correlation data indicates a stronger correlation than the second correlation data for the portion of the first time window; and
based at least in part on determining that the first correlation data indicates stronger correlation than the second correlation data, associating the first event with the first audio source.

5. The computer-implemented method of claim 4, wherein determining the first correlation data further comprises:
determining that the first portion of the first data is equal to the second data during a first segment of the portion of the first time window;
determining that the first portion of the first data is different than the second data during a second segment of the portion of the first time window;
determining, based on the first segment of the portion of the first time window, a correlation value indicating a similarity between the first portion of the first data and the second data; and
determining the first correlation data using the correlation value.

6. The computer-implemented method of claim 4, wherein determining the first correlation data further comprises:
determining a first pulse represented in the first portion of the first data during the portion of the first time window;
determining first timestamp data corresponding to a beginning of the first pulse;
determining second timestamp data corresponding to an ending of the first pulse;
determining a second pulse represented in the second data during the portion of the first time window;
determining third timestamp data corresponding to a beginning of the second pulse;

determining fourth timestamp data corresponding to an ending of the second pulse; and
determining the first correlation data using the first timestamp data, the second timestamp data, the third timestamp data, and the fourth timestamp data.

7. The computer-implemented method of claim 4, further comprising:
receiving, by a first component, first audio data associated with a first microphone;
receiving, by the first component, second audio data associated with a second microphone;
generating, by the first component, third audio data based on at least one of the first audio data and the second audio data;
generating, by the first component, the first portion of the first data indicating when the first audio source is represented in the third audio data;
generating, by the first component, the second portion of the first data indicating when the second audio source is represented in the third audio data; and
generating, by a second component, the second data, the second data indicating when an acoustic event is detected in the third audio data.

8. The computer-implemented method of claim 4, further comprising:
receiving, by a wakeword detector, first audio data;
determining, by the wakeword detector, that a wakeword is represented in a portion of the first audio data;
generating, by the wakeword detector, the second data including the first event, the first event indicating that the wakeword is represented in the portion of the first audio data; and
associating the first audio source with the wakeword.

9. The computer-implemented method of claim 4, further comprising:
receiving, by an acoustic event detector, first audio data;
determining, by the acoustic event detector, that an acoustic event is represented in a portion of the first audio data;
generating, by the acoustic event detector, the second data including the first event, the first event indicating that the acoustic event is detected in the portion of the first audio data; and
associating the first audio source with the acoustic event.

10. The computer-implemented method of claim 4, further comprising:
receiving, by a wakeword detector, first audio data;
determining, by the wakeword detector, that a wakeword is represented in a first portion of the first audio data;
generating, by the wakeword detector, the second data including the first event, the first event indicating that the wakeword is represented in the first portion of the first audio data;
receiving, by an acoustic event detector, the first audio data;
determining, by the acoustic event detector, that an acoustic event is represented in a second portion of the first audio data; and
generating, by the acoustic event detector, third data indicating that the acoustic event is detected in the second portion of the first audio data.

11. The computer-implemented method of claim 4, further comprising:
receiving third data;
determining, using the third data, a third direction of an audio source having a strongest signal quality metric during the portion of the first time window;

determining a first difference between the third direction and the first direction associated with the first audio source;

determining a second difference between the third direction and the second direction associated with the second audio source;

determining, using the first difference, the first correlation data; and determining, using the second difference, the second correlation data.

12. The computer-implemented method of claim 4, further comprising:

receiving, by a first component from a second component, a first segment of the first data embedded with a first timestamp generated by the second component;

receiving, by the first component from the second component, a second segment of the first data embedded with a second timestamp generated by the second component;

receiving, by the first component from the second component, a third segment of the first data embedded with a third timestamp generated by the second component;

receiving, by a third component from the second component, first audio data embedded with the first timestamp, the second timestamp, and the third timestamp;

detecting, by the third component, an acoustic event represented in a portion of the first audio data; and generating, by the third component, the second data including the first event, the second data indicating that the first event begins at the first timestamp and ends at the second timestamp.

13. The computer-implemented method of claim 4, wherein the first portion of the first data includes a first value representing the first direction and the second portion of the first data includes a second value representing the second direction.

14. The computer-implemented method of claim 4, wherein the first portion of the first data includes an azimuth value indicating that the first audio source is in the first direction relative to a device.

15. The computer-implemented method of claim 4, wherein determining that the first correlation data indicates a stronger correlation than the second correlation data further comprises:

determining, using the first correlation data, a first correlation value corresponding to the portion of the first time window;

determining, using the second correlation data, a second correlation value corresponding to the portion of the first time window; and determining that the first correlation value exceeds the second correlation value.

16. A system comprising:

at least one processor; and memory including instructions operable to be executed by the at least one processor to cause the system to:

receive first data;

determine that a first portion of the first data represents a first audio source, wherein the first portion of the first data is associated with a first time window and indicates a first direction;

determine that a second portion of the first data represents a second audio source, wherein the second portion of the first data is associated with the first time window and indicates a second direction that is different from the first direction;

receive second data;

determine, using the second data, occurrence of a first event during a portion of the first time window;

determine first correlation data indicating a first correlation between the second data and the first portion of the first data;

determine second correlation data indicating a second correlation between the second data and the second portion of the first data;

determine that the first correlation data indicates a stronger correlation than the second correlation data for the portion of the first time window; and based at least in part on determining that the first correlation data indicates stronger correlation than the second correlation data, associate the first event with the first audio source.

17. The system of claim 16, wherein the memory further comprises instructions that, when executed by the at least one processor, further cause the system to:

determine that the first portion of the first data is equal to the second data during a first segment of the portion of the first time window;

determine that the first portion of the first data is different than the second data during a second segment of the portion of the first time window;

determine, based on the first segment of the portion of the first time window, a correlation value indicating a similarity between the first portion of the first data and the second data; and determine the first correlation data using the correlation value.

18. The system of claim 16, wherein the memory further comprises instructions that, when executed by the at least one processor, further cause the system to:

determine a first pulse represented in the first portion of the first data during the portion of the first time window;

determine first timestamp data corresponding to a beginning of the first pulse;

determine second timestamp data corresponding to an ending of the first pulse;

determine a second pulse represented in the second data during the portion of the first time window;

determine third timestamp data corresponding to a beginning of the second pulse;

determine fourth timestamp data corresponding to an ending of the second pulse; and determine the first correlation data using the first timestamp data, the second timestamp data, the third timestamp data, and the fourth timestamp data.

19. The system of claim 16, wherein the memory further comprises instructions that, when executed by the at least one processor, further cause the system to:

receive, by a first component, first audio data associated with a first microphone;

receive, by the first component, second audio data associated with a second microphone;

generate, by the first component, third audio data based on at least one of the first audio data and the second audio data;

generate, by the first component, the first portion of the first data indicating when the first audio source is represented in the third audio data;

generate, by the first component, the second portion of the first data indicating when the second audio source is represented in the third audio data; and generate, by a second component, the second data, the second data indicating when an acoustic event is detected in the third audio data.

20. The system of claim 16, wherein the memory further comprises instructions that, when executed by the at least one processor, further cause the system to:

receive, by a wakeword detector, first audio data;

determine, by the wakeword detector, that a wakeword is represented in a portion of the first audio data;

generate, by the wakeword detector, the second data including the first event, the first event indicating that the wakeword is represented in the portion of the first audio data; and associate the first audio source with the wakeword.

21. The system of claim 16, wherein the memory further comprises instructions that, when executed by the at least one processor, further cause the system to:

receive, by an acoustic event detector, first audio data;

determine, by the acoustic event detector, that an acoustic event is represented in a portion of the first audio data;

generate, by the acoustic event detector, the second data including the first event, the first event indicating that the acoustic event is detected in the portion of the first audio data; and associate the first audio source with the acoustic event.

22. The system of claim 16, wherein the memory further comprises instructions that, when executed by the at least one processor, further cause the system to:

receive third data;

determine, using the third data, a third direction of an audio source having a strongest signal quality metric during the portion of the first time window;

determine a first difference between the third direction and the first direction associated with the first audio source;

determine a second difference between the third direction and the second direction associated with the second audio source;

determine, using the first difference, the first correlation data; and determine, using the second difference, the second correlation data.

* * * * *